United States Patent
Lee et al.

(10) Patent No.: US 11,611,926 B2
(45) Date of Patent: Mar. 21, 2023

(54) ACCESS CONTROL FOR DATA TRANSMISSION

(71) Applicant: LG ELECTRONICS INC., Seoul (KR)

(72) Inventors: Youngdae Lee, Seoul (KR); Hyunjung Choe, Seoul (KR)

(73) Assignee: LG ELECTRONICS INC., Seoul (KR)

(*) Notice: Subject to any disclaimer, the term of this patent is extended or adjusted under 35 U.S.C. 154(b) by 17 days.

(21) Appl. No.: 17/272,773

(22) PCT Filed: Sep. 27, 2019

(86) PCT No.: PCT/KR2019/012559
§ 371 (c)(1),
(2) Date: Mar. 2, 2021

(87) PCT Pub. No.: WO2020/067749
PCT Pub. Date: Apr. 2, 2020

(65) Prior Publication Data
US 2021/0204192 A1  Jul. 1, 2021

(30) Foreign Application Priority Data
Sep. 28, 2018  (KR) .................. 10-2018-0115561

(51) Int. Cl.
*H04W 72/14* (2009.01)
*H04W 48/02* (2009.01)
*H04W 72/1268* (2023.01)

(52) U.S. Cl.
CPC ....... *H04W 48/02* (2013.01); *H04W 72/1268* (2013.01); *H04W 72/14* (2013.01)

(58) Field of Classification Search
CPC .................... H04W 48/02; H04W 72/048
See application file for complete search history.

(56) References Cited

U.S. PATENT DOCUMENTS 11,063,820 B2 * 7/2021 Kim .................... H04L 41/0806
11,412,439 B2 * 8/2022 Wallentin ............ H04W 68/005
(Continued)

FOREIGN PATENT DOCUMENTS

WO  2012152310   11/2012
WO  2016144009    9/2016

OTHER PUBLICATIONS

3rd Generation Partnership Project (3GPP), "Technical Specification Group Radio Access Network; Evolved Universal Terrestrial Radio Access (E-UTRA); and Evolved Universal Terrestrial Radio Access Network (E-UTRAN); Overall description; Stage 2 (Release 15)," Section 11.1.2 of 3GPP TS 36.300 V15.2.0, Jun. 2018, 4 pages.

(Continued)

*Primary Examiner* — Michael T Vu
(74) *Attorney, Agent, or Firm* — Lee, Hong, Degerman, Kang & Walmey

(57) ABSTRACT

A method and apparatus for access control for data transmission in idle mode and/or inactive mode in a wireless communication system is provided. An allowed timer is defined, and the allowed timer is started based on a result of access barring check. While the allowed timer is running, the wireless device can perform an uplink (UL) transmission without further access barring check.

13 Claims, 16 Drawing Sheets

(56) References Cited

U.S. PATENT DOCUMENTS

| | | | |
|---|---|---|---|
| 2011/0274040 A1 | 11/2011 | Pani et al. | |
| 2015/0173119 A1 | 6/2015 | Wirtanen et al. | |
| 2017/0325282 A1* | 11/2017 | Hong | H04W 76/27 |
| 2021/0410045 A1* | 12/2021 | Kadiri | H04W 76/27 |

OTHER PUBLICATIONS

3rd Generation Partnership Project (3GPP), "Technical Specification Group Radio Access Network; NR; NR and NG-RAN Overall Description; Stage 2 (Release 15)," Section 10.3 of 3GPP TS 38.300 V15.2.0, Jun. 2018, 4 pages.

3rd Generation Partnership Project (3GPP), "Technical Specification Group Radio Access Network; NR; NR and NG-RAN Overall Description; Stage 2 (Release 15)," Section 7.4 of 3GPP TS 38.300 V15.2.0, Jun. 2018, 3 pages.

3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN)"; Overall description; Stage 2 (Release 15), Section 7.3 of 3GPP TS 36.300 V15.2.0, Jun. 2018, 10 pages.

3rd Generation Partnership Project (3GPP), "Technical Specification Group Radio Access Network; Evolved Universal Terrestrial Radio Access (E-UTRA)"; Medium Access Control (MAC) protocol specification (Release 15); Section 5.10 of 3GPP TS 36.321 V15.2.0, Jul. 2018, 5 pages.

3rd Generation Partnership Project (3GPP), "Technical Specification Group Radio Access Network; NR; Medium Access Control (MAC) protocol specification"; (Release 15), Section 5.8.2 of 3GPP TS 38.321 V15.2.0, Jun. 2018, 5 pages.

3rd Generation Partnership Project (3GPP), "Technical Specification Group Services and System Aspects"; System Architecture for the 5G System; Stage 2 (Release 15), Section 5.3.3.2.5 of 3GPP TS 23.501 V15.2.0, Jun. 2018, 4 pages.

3rd Generation Partnership Project (3GPP), "Technical Specification Group Services and System Aspects" Procedures for the 5G System; Stage 2 (Release 15), Section 4.8 of 3GPP TS 23.502 V15.2.0, Jun. 2018, 4 pages.

PCT International Application No. PCT/KR2019/012559, International Search Report dated Jan. 13, 2020, 2 pages.

LG Electronics Inc., "Handling of Timers in UAC," 3GPP TSG-RAN WG2 #101Bis, R2-1805938, Apr. 2018, 4 pages.

* cited by examiner

ACCESS CONTROL FOR DATA TRANSMISSION

CROSS-REFERENCE TO RELATED APPLICATIONS

This application is the National Stage filing under 35 U.S.C. 371 of International Application No. PCT/KR2019/012559, filed on Sep. 27, 2019, which claims the benefit of earlier filing date and right of priority to Korean Application No. 10-2018-0115561, filed on Sep. 28, 2018, the contents of which are all incorporated by reference herein in their entirety.

TECHNICAL FIELD

The present disclosure relates to access control for data transmission in idle mode and/or inactive mode.

BACKGROUND

3rd Generation Partnership Project (3GPP) Long-Term Evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in International Telecommunication Union (ITU) and 3GPP to develop requirements and specifications for New Radio (NR) systems. 3GPP has to identify and develop the technology components needed for successfully standardizing the new RAT timely satisfying both the urgent market needs, and the more long-term requirements set forth by the ITU radio communication sector (ITU-R) International Mobile Telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced Mobile Broadband (eMBB), massive Machine-Type Communications (mMTC), Ultra-Reliable and Low Latency Communications (URLLC), etc. The NR shall be inherently forward compatible.

Rel-13, Narrowband Internet-of-Things (NB-IoT) and LTE for MTC (LTE-M) were standardized to provide wide-area connectivity for IoT. The technologies in R31-14 evolved beyond the basic functionality specified in Rel-13. In Rel-15, to optimize the support for infrequent small data packet transmissions, a mechanism for data transmission during the random access procedure is specified for NB-IoT and LTE-M. This mechanism may be referred to as Early Data Transmission (EDT) and can improve the device battery life and reduces the message latency.

SUMMARY

Data transmission in idle state and/or inactive state is being discussed. Since data transmission is connected state is possible if access attempt is allowed as a result of access barring check, access control for data transmission in idle state and/or inactive state should also be addressed.

In an aspect, a method performed by a wireless device is provided. The method includes receiving a timer value for an allowed timer, starting the allowed timer with the timer value based on a result of access barring check, and performing an uplink (UL) transmission while the allowed timer is running.

In another aspect, an apparatus for implementing the above mentioned methods is provided.

The present disclosure can have various advantageous effects.

For example, data transmission in idle state and/or inactive state can be subject to the access control.

For example, if the access attempt is allowed by the result of the access barring check, the wireless device can transmit data in idle state and/or inactive state during a time interval configured by the allowed time.

For example, if the access attempt is not allowed by the result of the access barring check, the wireless device can delay data transmission in idle state and/or inactive state during a time interval configured by the barring time.

For example, both data transmission in connected state and data transmission in idle state and/or inactive state can be treated fairly, i.e., subject to the access control.

For example, when data is transmitted in idle state and/or inactive state it is possible to control data transmission that can occur for a long time in a differentiated way per each access category according to the congestion situation.

Advantageous effects which can be obtained through specific embodiments of the present disclosure are not limited to the advantageous effects listed above. For example, there may be a variety of technical effects that a person having ordinary skill in the related art can understand and/or derive from the present disclosure.

Accordingly, the specific effects of the present disclosure are not limited to those explicitly described herein, but may include various effects that may be understood or derived from the technical features of the present disclosure.

DETAILED DESCRIPTION

Figure 1:
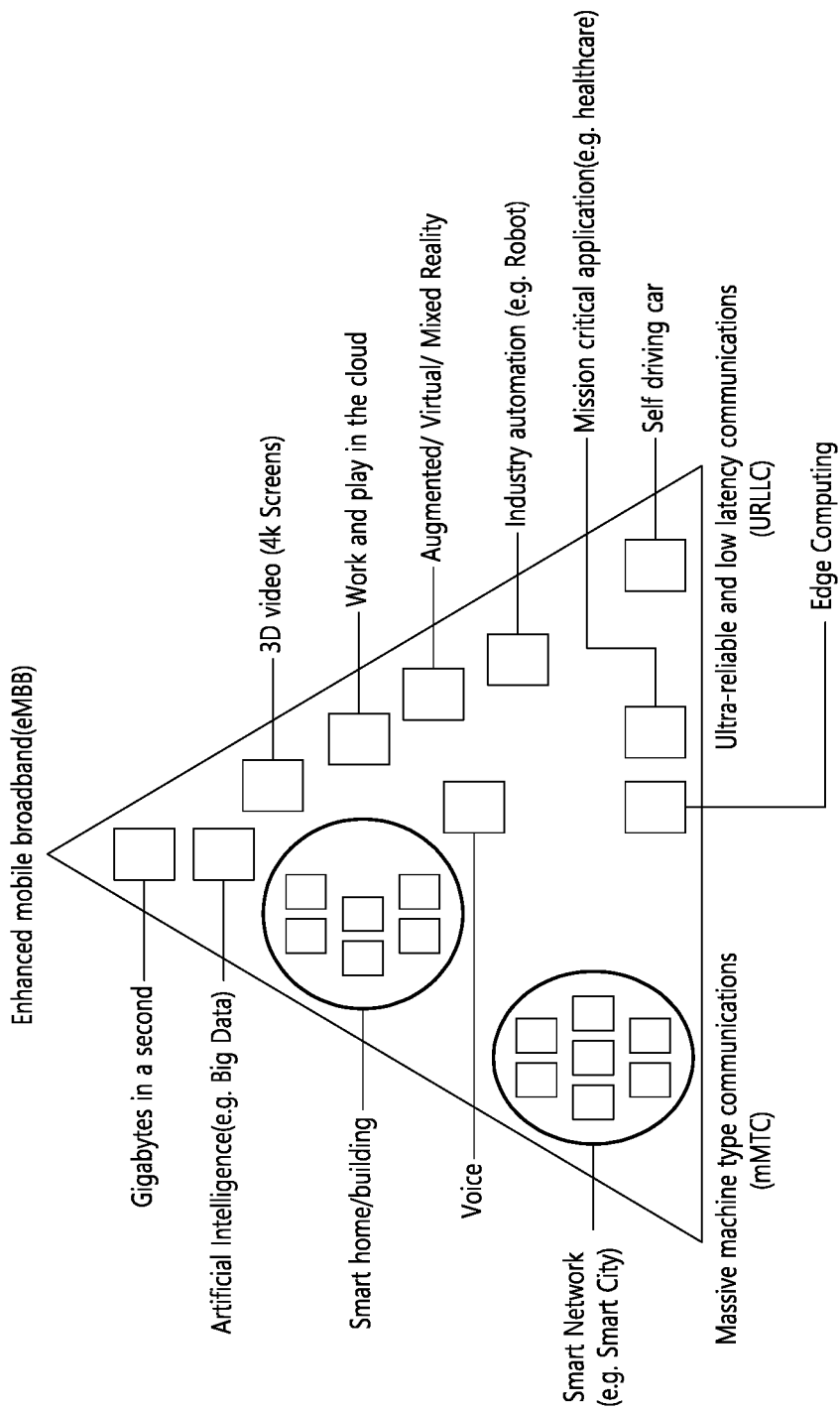
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the present disclosure, the term "or" should be interpreted to indicate "and/or." For instance, the expression "A or B" may comprise 1) only A, 2) only B, and/or 3) both A and B. In other words, the term "or" in the present disclosure should be interpreted to indicate "additionally or alternatively."

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
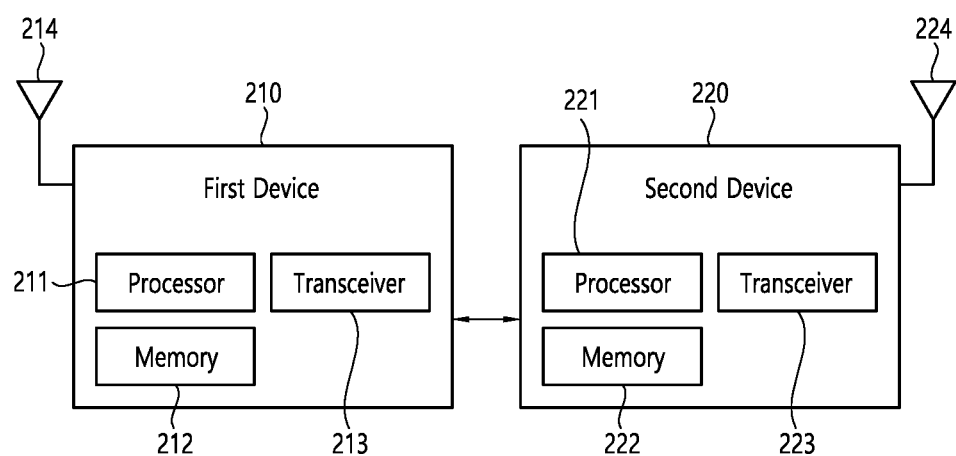
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g., a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 221, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
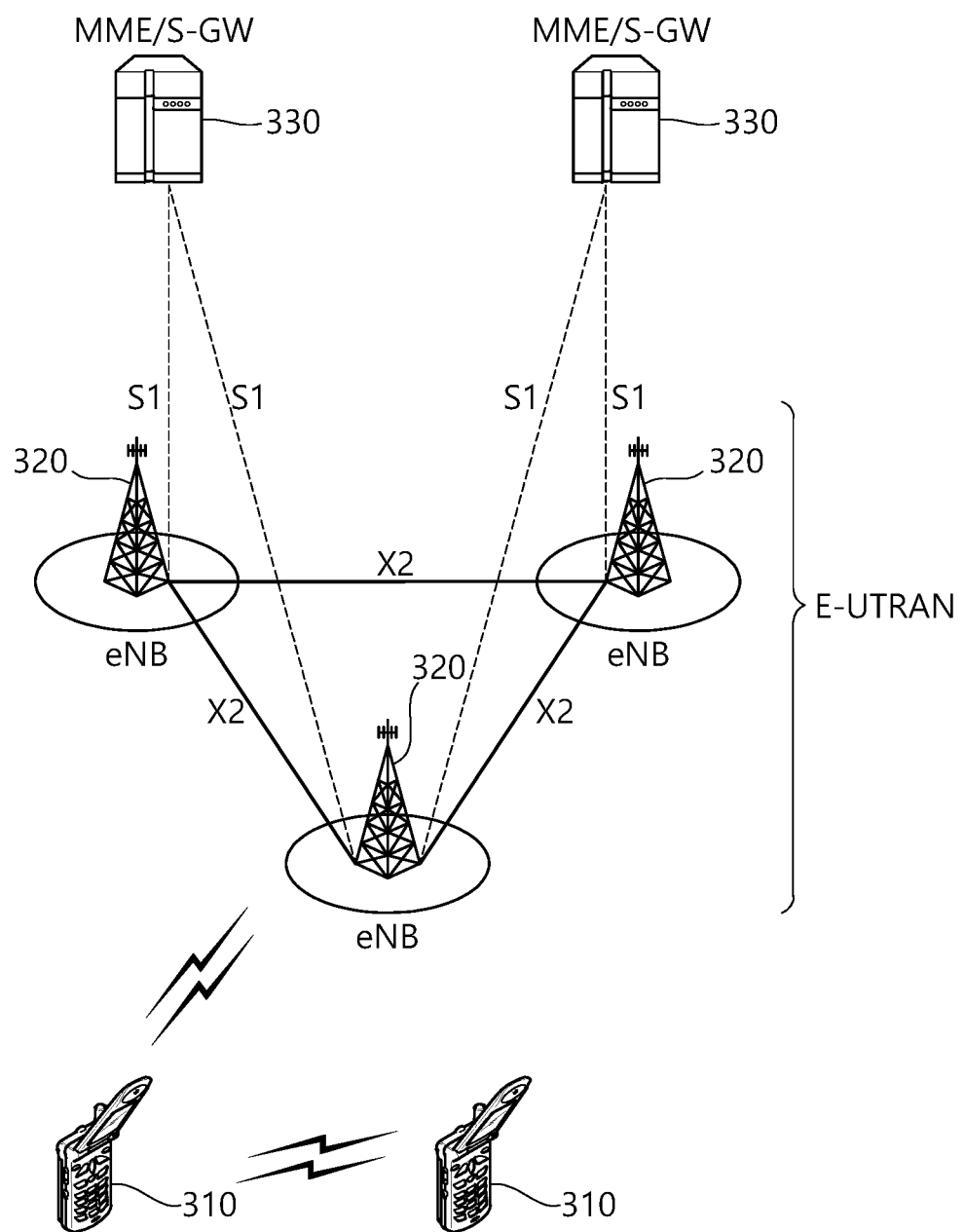
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
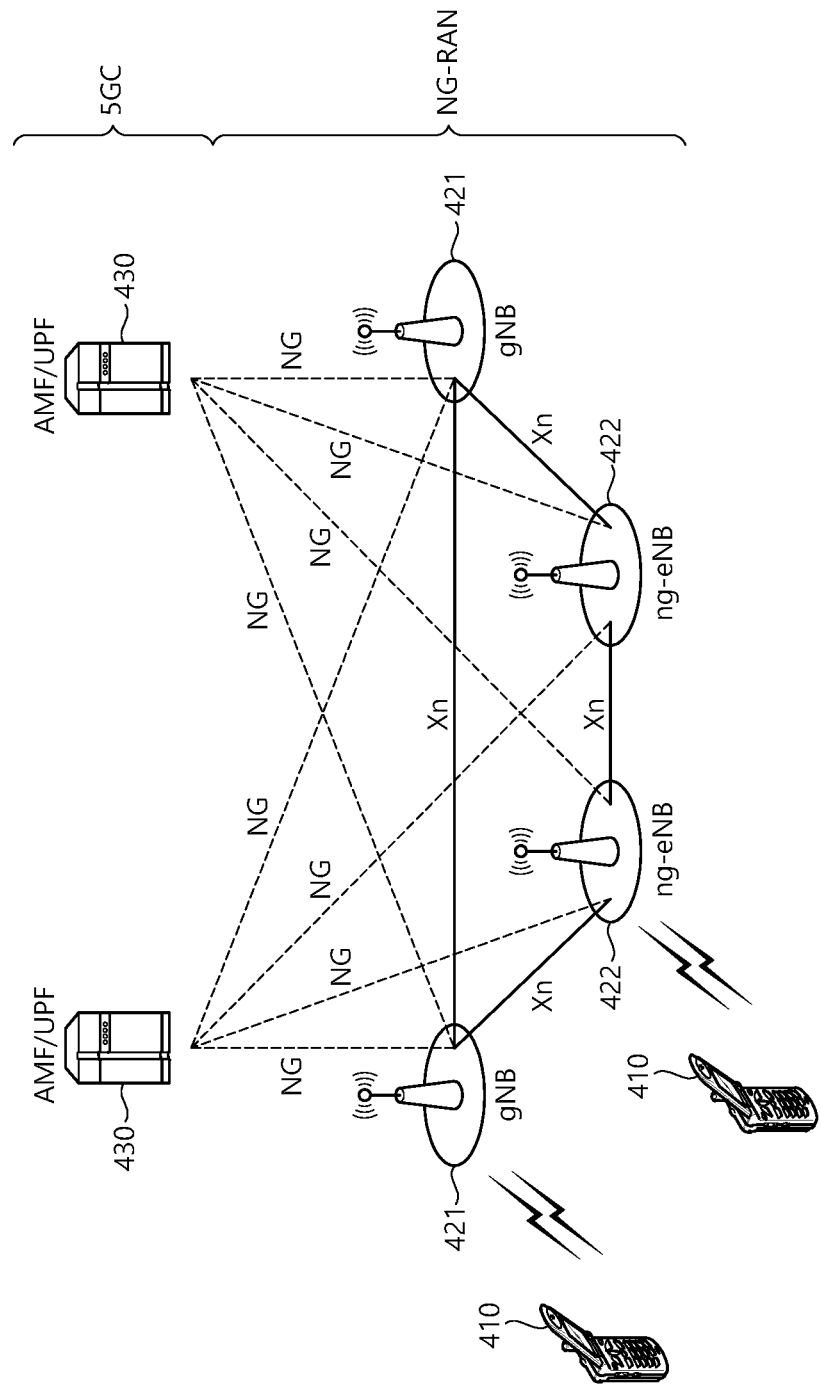
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g., eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g., NG-RAN and/or E-UTRAN) may be classified into a first layer (L1), a second layer (L2), and a third layer (L3) based on the lower three layers of the open system interconnection (OSI) model that is well-known in the communication system.

Figure 5:
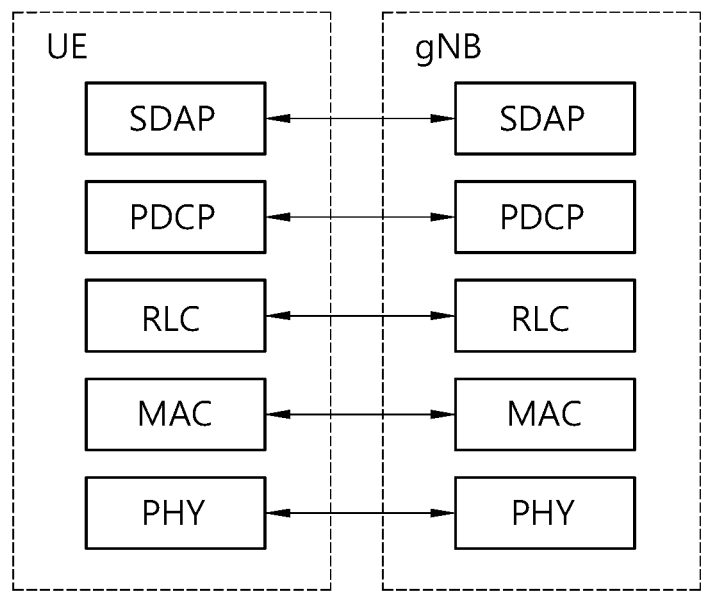
FIG. 5 shows a block diagram of a user plane protocol stack to which the technical features of the present disclosure can be applied.
Figure 6:
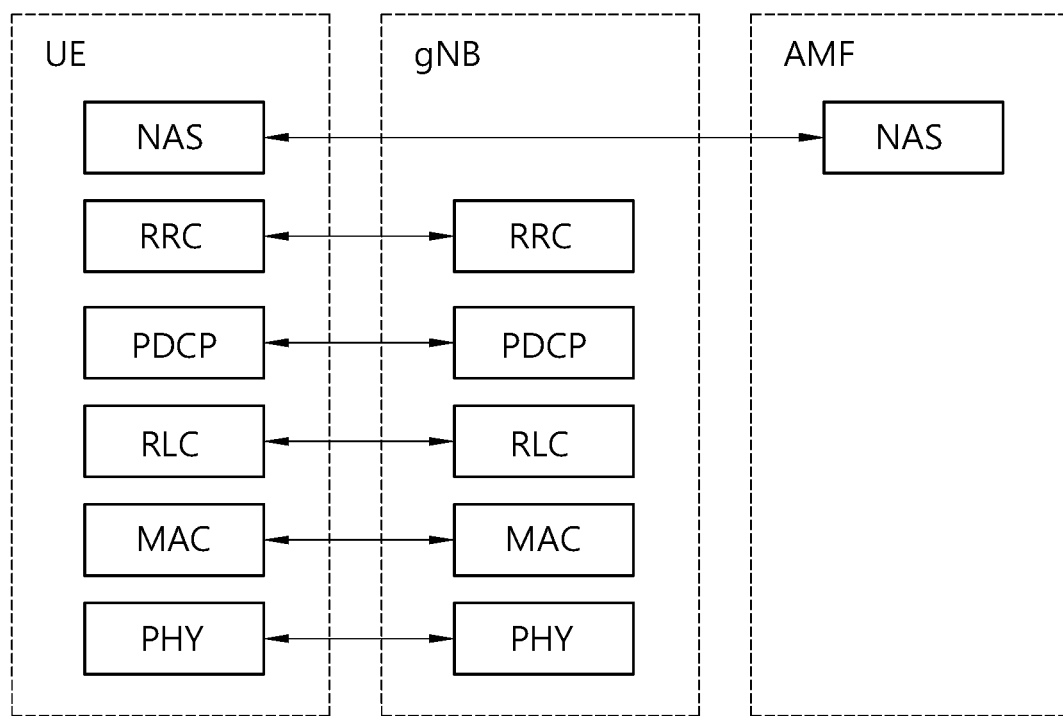
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e., transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e., E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

The RRC inactive state is described in detail. Section 5.3.3.2.5 of 3GPP TS 23.501 V15.2.0 (2018-06) and Section 4.8 of 3GPP TS 23.502 V15.2.0 (2018-06) can be referred. The following description of the RRC inactive state will be described by taking NR as an example, but it can be applied to LTE-A without loss of generality. For example, in the following description, NG-RAN node/gNB may be replaced with eNB and/or more generally BS, and AMF may be replaced with MME.

The RRC inactive state applies to NG-RAN node. The AMF, based on network configuration, may provide RRC inactive assistance information to the NG-RAN node, to assist the NG-RAN's decision whether the UE can be sent to RRC inactive state.

The RRC inactive assistance information includes at least one of the followings.
UE specific DRX values
The registration area provided to the UE
Periodic registration update timer
If the AMF has enabled mobile initiated connection only (MICO) mode for the UE, an indication that the UE is in MICO mode.
Information from the UE permanent identifier that allows the NG-RAN node to calculate the UE's RAN paging occasions (POs).

The RRC inactive assistance information mentioned above is provided by the AMF during N2 activation with the (new) serving NG-RAN node (i.e., during registration, service request, handover) to assist the NG-RAN node's decision whether the UE can be sent to RRC inactive state. RRC inactive state is part of RRC state machine, and it is up to the NG-RAN node to determine the conditions to enter RRC inactive state. If any of the parameters included in the RRC inactive assistance information changes as the result of NAS procedure, the AMF shall update the RRC inactive assistance information to the NG-RAN node.

When the UE is in connection management connected state (CM-CONNECTED), if the AMF has provided RRC inactive assistance information, the NG-RAN node may decide to move a UE to CM-CONNECTED with RRC inactive state.

The state and "endpoints" (in case of Dual Connectivity configuration) of the N2 and N3 reference points are not changed by the UE entering CM-CONNECTED with RRC inactive state. A UE in RRC inactive state is aware of the RAN Notification Area and periodic RAN Notification Area Update (RNAU) timer.

The 5GC network is not aware of the UE transitions between CM-CONNECTED with RRC_CONNECTED and CM-CONNECTED with RRC inactive state, unless the 5GC network is notified via N2 notification procedure.

At transition into CM-CONNECTED with RRC inactive state, the NG-RAN node configures the UE with a periodic RAN notification area update timer taking into account the value of the periodic registration update timer value indicated in the RRC inactive assistance information, and uses a guard timer with a value longer than the RAN notification area update timer value provided to the UE.

If the periodic RAN notification area update guard timer expires in NG-RAN node, the NG-RAN node shall initiate access network (AN) release procedure.

When the UE is in CM-CONNECTED with RRC inactive state, the UE performs PLMN selection procedures for connection management idle state (CM-IDLE).

When the UE is CM-CONNECTED with RRC inactive state, the UE may resume the RRC connection due to at least one of the followings.

UL data pending

Mobile originated (MO) NAS signaling procedure

As a response to RAN paging

Notifying the network that it has left the RAN notification area

Upon periodic RAN Notification Area Update timer expiration.

If the UE resumes the connection in a different NG-RAN node within the same PLMN or equivalent PLMN, the UE AS context is retrieved from the old NG-RAN node and a procedure is triggered towards the CN.

If the RAN paging procedure is not successful in establishing contact with the UE, the procedure shall be handled by the network as follows.

If NG-RAN node has at least one pending NAS PDU for transmission, the NG-RAN node shall initiate the AN release procedure to move the UE CM state in the AMF to CM-IDLE and indicate to the AMF the NAS non-delivery.

If NG-RAN node has only pending user plane data for transmission, the NG-RAN node may keep the N2 connection active or initiate the AN release procedure based on local configuration in NG-RAN node.

The user plane data which triggers the RAN paging can be lost, e.g., in the case of RAN paging failure.

If a UE in CM-CONNECTED with RRC inactive state performs cell selection to GERAN/UTRAN/E-UTRAN, it shall follow idle mode procedures of the selected RAT.

In addition, a UE in CM-CONNECTED state with RRC inactive state shall enter CM-IDLE and initiates the NAS signaling recovery in at least one of the following cases.

If RRC resume procedure fails;

If the UE receives core network paging;

If the periodic RAN notification area update timer expires and the UE cannot successfully resume the RRC connection;

In any other failure scenario that cannot be resolved in RRC inactive state and requires the UE to move to CM-IDLE.

When the UE is in CM-CONNECTED with RRC inactive state, if NG-RAN node has received location reporting control message from AMF with the reporting type indicating single stand-alone report, the NG-RAN node shall perform RAN paging before reporting the location to AMF.

When the UE is in CM-CONNECTED with RRC inactive state, if NG-RAN node has received location reporting control message from AMF with the reporting type indicating continuously reporting whenever the UE changes cell, the NG-RAN node shall send a location report message to AMF including UE's last known location with time stamp.

When the UE is CM-CONNECTED with RRC inactive state, if the AMF receives Nudm_UEContextManagement_DeregistrationNotification from user data management (UDM), the AMF shall initiate AN release procedure.

When UE is in CM-CONNECTED with RRC inactive state, if NG-RAN node has received location reporting control message from AMF with the reporting type of the area of interest based reporting, the NG-RAN node shall send a location report message to AMF including UE presence in the area of interest (i.e., IN, OUT, or UNKNOWN) and the UE's last known location with time stamp.

When the UE is in CM-CONNECTED with RRC inactive state, if the old NG-RAN node that sent the UE into RRC inactive state receives the downlink N2 signaling, it initiates the RAN paging. If the UE resumes the RRC connection towards a different NG-RAN node, the old NG-RAN node includes the UE context transfer indication into a response container to the NF (e.g., AMF or SMF) that generates such N2 downlink signaling. Then the NF shall reattempt the same procedure when the path switch from the old NG-RAN node to the new NG-RAN node is complete.

Figure 7:
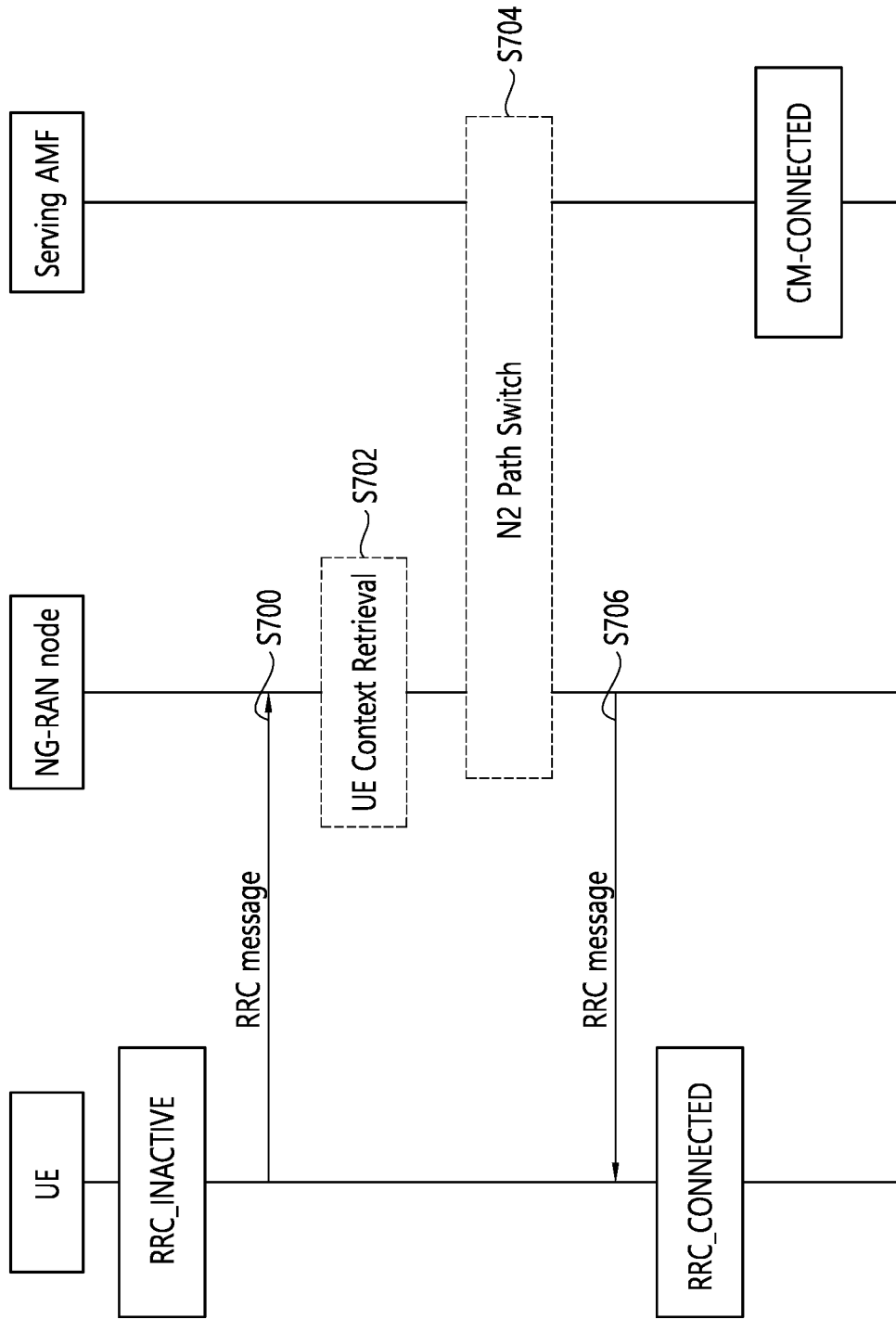
FIG. 7 shows an example of a connection resume procedure to which the technical features of the present disclosure can be applied.

FIG. 7 shows an example of a connection resume procedure to which the technical features of the present disclosure can be applied.

The connection resume procedure is used by the UE to perform RRC inactive to RRC connected state transition.

In step S700, while the UE is in RRC_INACTIVE, the UE transmits an RRC message to the NG-RAN node to initiate the transition from RRC_INACTIVE to RRC_CONNECTED. The UE provides its resume ID needed by the NG-RAN node to access the UE's stored context. The RRC message may be RRCConnectionResumeRequest message which will be described in detail below.

In step S702, the NG-RAN node may conditionally perform UE context retrieval. The UE context retrieval is performed when the UE context associated with the UE attempting to resume its connection is not locally available at the accessed NG-RAN node.

In step S704, the NG-RAN node may conditionally perform N2 path switch procedure towards the serving AMF. If the target NG-RAN node is different from the old NG-RAN node, the serving NG-RAN node initiates N2 path switch procedure and including Xn data forwarding. The NG-RAN node sends UE notification message to report that the UE is in RRC_CONNECTED if the AMF requested N2 notification to the NG-RAN node.

In step S706, the NG-RAN node transmits an RRC message to the UE to confirm to the UE that the UE has entered RRC_CONNECTED. The RRC message includes resume ID of the UE.

Table 3 shows an example of RRCConnectionResumeRequest message. The RRCConnectionResumeRequest message may be the RRC message which is transmitted in step S700 of FIG. 7. The RRCConnectionResumeRequest message is used to request the resumption of a suspended RRC connection. The SRB for the RRCConnectionResumeRequest message may be SRB0. The RRCConnectionResumeRequest message may be transmitted via logical channel CCCH.

TABLE 3

```
-- ASN1START
RRCConnectionResumeRequest-r13 ::= SEQUENCE {
criticalExtensions                      CHOICE {
    rrcConnectionResumeRequest-r13          RRCConnectionResumeRequest-r13-
IEs,
    criticalExtensionsFuture        SEQUENCE {}
}
}
RRCConnectionResumeRequest-r13-IEs ::= SEQUENCE {
resumeIdentity-r13                      CHOICE {
    resumeID-r13                            ResumeIdentity-r13,
    truncatedResumeID-r13                   BIT STRING (SIZE (24))
},
shortResumeMAC-I-r13                    BIT STRING (SIZE (16)),
resumeCause-r13                         ResumeCause,
spare                                   BIT STRING (SIZE (1))
}
ResumeCause ::= ENUMERATED {
                emergency, highPriority Access, mt-Access, mo-Signalling,
*158            mo-Data, delayTolerantAccess-v1020, mo-VoiceCall-v1280,
spare 1}
-- ASN1STOP
```

Referring to Table 3, the resumeCause field provides the resume cause for the RRC connection resume request as provided by the upper layers. The resumeIdentity field indicates UE identity to facilitate UE context retrieval at BS. The shortResumeMAC-I field indicates authentication token to facilitate UE authentication at BS.

Transport of NAS messages and early data transmission (EDT) are described. Section 7.3 of 3GPP TS 36.300 V15.2.0 (2018-06) can be referred. The following description of the RRC inactive state will be described by taking LTE-A as an example, but it can be applied to NR without loss of generality. For example, in the following description, eNB may be replaced with NG-RAN node/gNB and/or more generally BS, and MME may be replaced with AMF.

The AS provides reliable in-sequence delivery of NAS messages in a cell. During handover, message loss or duplication of NAS messages can occur.

In E-UTRAN, NAS messages are either concatenated with RRC messages or carried in RRC without concatenation. Upon arrival of concurrent NAS messages for the same UE requiring both concatenation with RRC for the high priority queue and also without concatenation for the lower priority queue, the messages are first queued as necessary to maintain in-sequence delivery.

In DL, when an EPS bearer (EPC) or PDU Session (5GC) establishment or release procedure is triggered, or for EDT in case of Control Plane CIoT EPS optimization, the NAS message should normally be concatenated with the associated RRC message. When the EPS bearer (EPC) or PDU Session (5GC) is modified and when the modification also depends on a modification of the radio bearer, the NAS message and associated RRC message should normally be concatenated. Concatenation of DL NAS with RRC message is not allowed otherwise. In UL, concatenation of NAS messages with RRC message is used only for transferring the initial NAS message during connection setup and for EDT in case of Control Plane CIoT EPS optimization. Initial direct transfer is not used in E-UTRAN and no NAS message is concatenated with RRC connection request.

Multiple NAS messages can be sent in a single downlink RRC message during EPS bearer (EPC) or PDU Session (5GC) establishment or modification. In this case, the order of the NAS messages in the RRC message shall be kept the same as that in the corresponding S1-AP (EPC) or NG-AP (5GC) message in order to ensure the in-sequence delivery of NAS messages.

NAS messages are integrity protected and ciphered by PDCP, in addition to the integrity protection and ciphering performed by NAS.

EDT allows one UL data transmission optionally followed by one DL data transmission during the random access procedure.

EDT is triggered when the upper layers have requested the establishment or resumption of the RRC connection for MO data (i.e., not signaling or short message service (SMS)) and the UL data size is less than or equal to a transport block size (TBS) indicated in the system information. EDT is not used for data over the control plane when using the user plane cellular IoT (CIoT) EPS optimizations.

EDT may be only applicable to bandwidth reduced low complexity (BL) UEs, UEs in enhanced coverage and/or narrowband IoT (NB-IoT) UEs.

Figure 8:
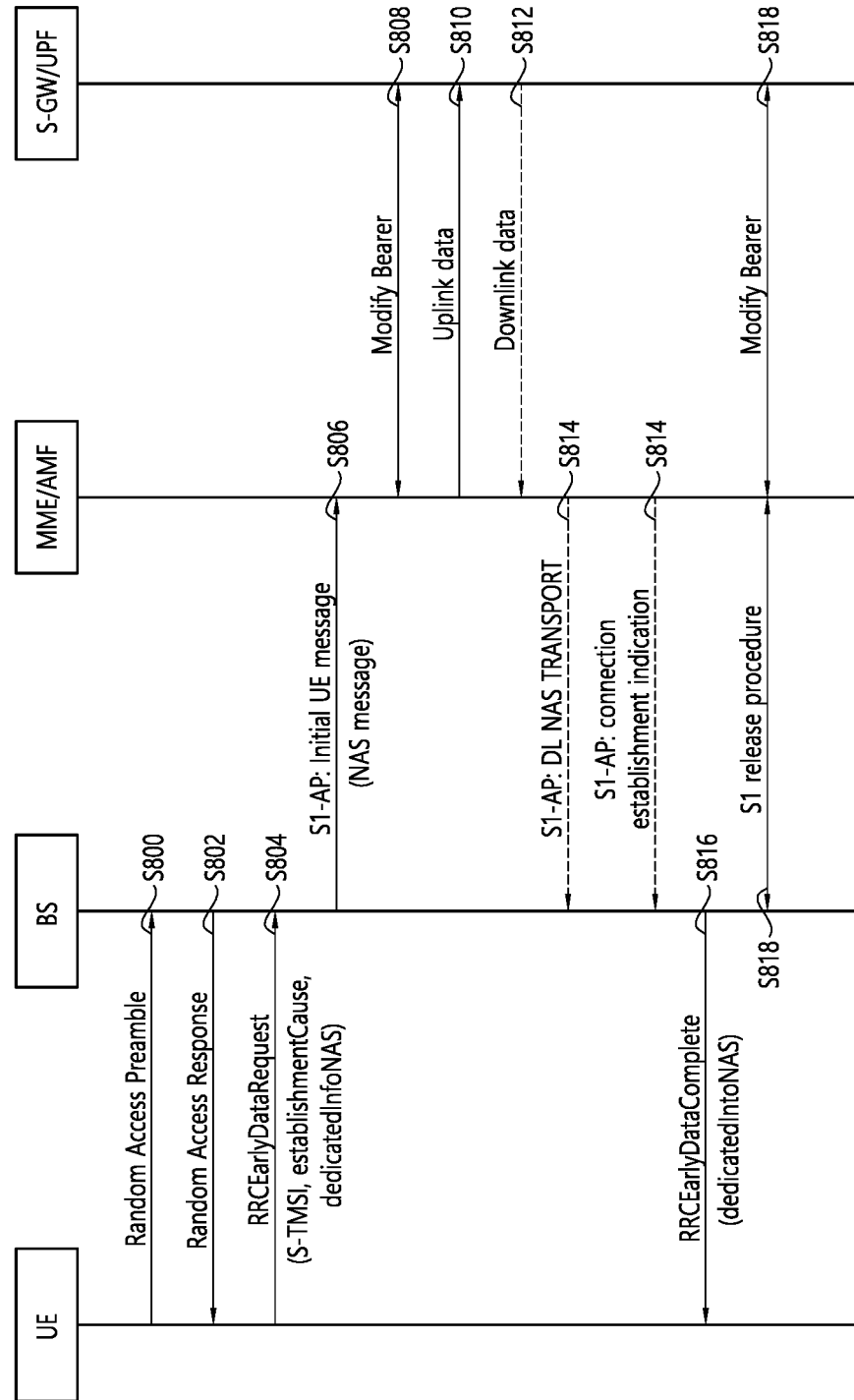
FIG. 8 shows an example of EDT for control plane CIoT EPS optimizations to which the technical features of the present disclosure can be applied.

FIG. 8 shows an example of EDT for control plane CIoT EPS optimizations to which the technical features of the present disclosure can be applied.

EDT for control plane (CP) CIoT EPS optimizations (simply as CP solution) is characterized as below.

UL user data are transmitted in a NAS message concatenated in UL RRCEarlyDataRequest message on CCCH;

DL user data are optionally transmitted in a NAS message embedded in DL RRCEarlyDataComplete message on CCCH;

There is no transition to RRC_CONNECTED.

Referring to FIG. 8, upon connection establishment request for MO data from the upper layers, the UE initiates the EDT procedure and selects a random access preamble configured for EDT. In step S800, the UE transmits the random access preamble to the BS, and in step S802, the BS transmits a random access response to the UE as a response to the random access preamble.

In step S804, the UE sends RRCEarlyDataRequest message concatenating the user data on CCCH. The RRCEarlyDataRequest message may further include SAE temporary mobile subscriber identity (S-TMSI) and/or establishment cause.

In step S806, the BS initiates the S1-AP initial UE message procedure to forward the NAS message and establish the S1 connection. The eNB may indicate in this procedure that this connection is triggered for EDT.

In step S808, the MME requests the S-GW to re-activate the EPS bearers for the UE.

In step S810, the MME sends the UL data to the S-GW.

In step S812, if DL data are available, the S-GW sends the DL data to the MME.

In step S814, if DL data are received from the S-GW, the MME forwards the data to the eNB via DL NAS transport procedure and may also indicate whether further data are expected. Otherwise, the MME may trigger connection establishment indication procedure and also indicate whether further data are expected.

In step S816, if no further data are expected, the BS can send the RRCEarlyDataComplete message on CCCH to keep the UE in RRC_IDLE. If the DL data were received in step S814, they are concatenated in RRCEarlyDataComplete message.

In step S818, the S1 connection is released and the EPS bearers are deactivated.

If the MME or the BS decides to move the UE in RRC_CONNECTED, RRCConnectionSetup message is sent in step S816 to fall back to the legacy RRC connection establishment procedure. The eNB will discard the zero-length NAS PDU received in msg5.

Figure 9:
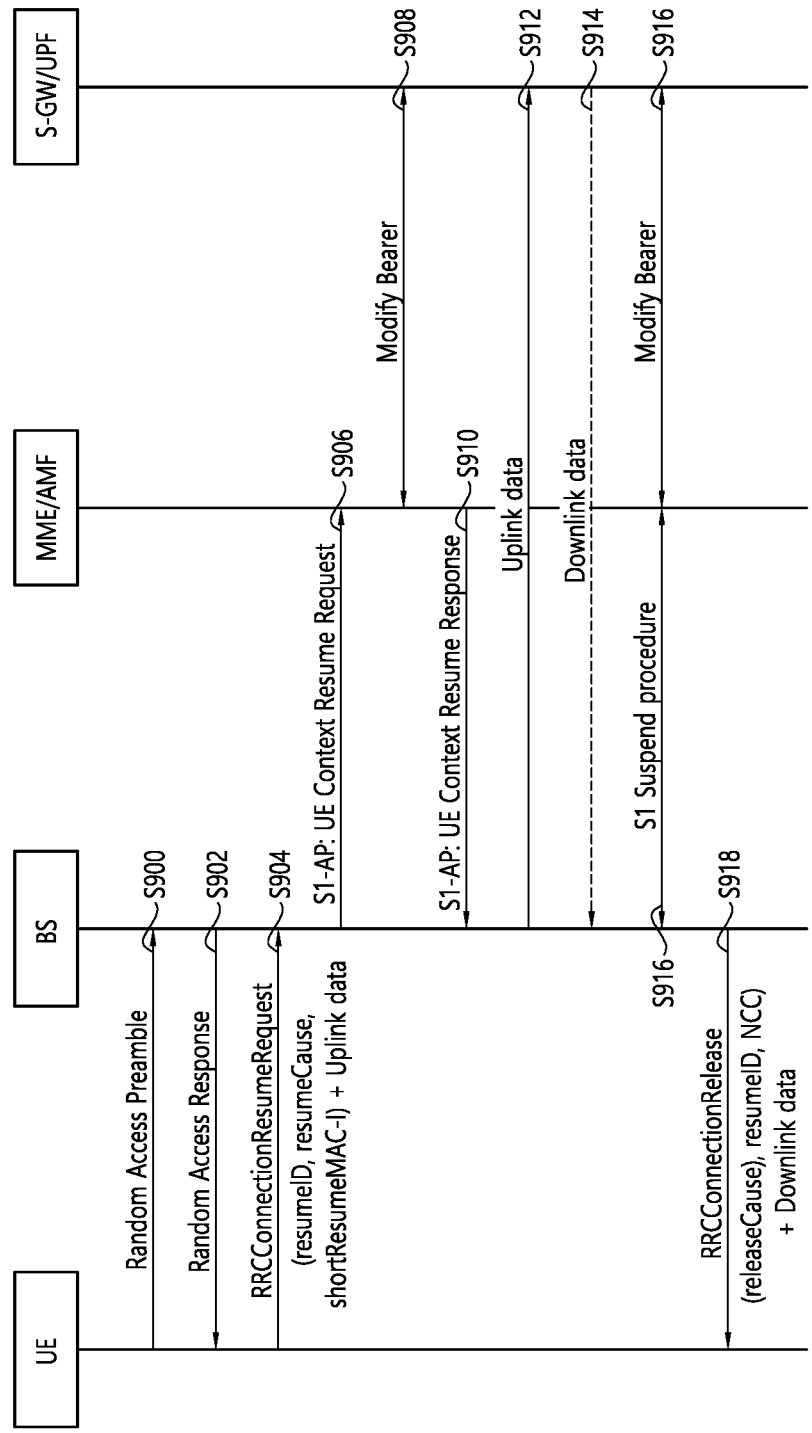
FIG. 9 shows an example of EDT for user plane CIoT EPS optimizations to which the technical features of the present disclosure can be applied.

FIG. 9 shows an example of EDT for user plane CIoT EPS optimizations to which the technical features of the present disclosure can be applied.

EDT for user plane (UP) CIoT EPS optimizations (simply as UP solution) is characterized as below.

- The UE has been provided with a NextHopChainingCount in the RRCConnectionRelease message with suspend indication;
- UL user data are transmitted on DTCH multiplexed with UL RRCConnectionResumeRequest message on CCCH;
- DL user data are optionally transmitted on DTCH multiplexed with DL RRCConnectionRelease message on DCCH;
- The short resume MAC-I is reused as the authentication token for RRCConnectionResumeRequest message and is calculated using the integrity key from the previous connection;
- The user data in UL and DL are ciphered. The keys are derived using the NextHopChainingCount provided in the RRCConnectionRelease message of the previous RRC connection;
- The RRCConnectionRelease message is integrity protected and ciphered using the newly derived keys;
- There is no transition to RRC_CONNECTED.

Referring to FIG. 9, upon connection resumption request for MO data from the upper layers, the UE initiates the EDT procedure and selects a random access preamble configured for EDT. In step S900, the UE transmits the random access preamble to the BS, and in step S902, the BS transmits a random access response to the UE as a response to the random access preamble.

In step S904, the UE sends an RRCConnectionResumeRequest message to the eNB, including its rsume ID, the establishment cause, and an authentication token. The UE resumes all SRBs and DRBs, derives new security keys using the NextHopChainingCount provided in the RRCConnectionRelease message of the previous connection and re-establishes the AS security. The user data are ciphered and transmitted on DTCH multiplexed with the RRCConnectionResumeRequest message on CCCH.

In step S906, the BS initiates the S1-AP context resume procedure to resume the S1 connection and re-activate the S1-U bearers.

In step S908, the MME requests the S-GW to re-activate the S1-U bearers for the UE.

In step S910, the MME confirms the UE context resumption to the BS.

In step S912, the UL data are delivered to the S-GW.

In step S914, if DL data are available, the S-GW sends the DL data to the BS.

In step S916, if no further data are expected from the S-GW, the eNB can initiate the suspension of the S1 connection and the deactivation of the S1-U bearers.

In step S918, the eNB sends the RRCConnectionRelease message to keep the UE in RRC_IDLE. The message includes the releaseCause set to rrc-Suspend, the resumeID, the NextHopChainingCount and drb-ContinueROHC which are stored by the UE. If DL data were received in step S914, they are sent ciphered on DTCH multiplexed with the RRCConnectionRelease message on DCCH.

If the MME or eNB decides the UE to move in RRC_CONNECTED, RRCConnectionResume message is sent in step S916 to fall back to the RRC connection resume procedure. In that case, the RRCConnectionResume message is integrity protected and ciphered with the keys derived in step S904 and the UE ignores the NextHopChainingCount included in the RRCConnectionResume message. DL data can be transmitted on DTCH multiplexed with the RRCConnectionResume message.

Uplink Semi-Persistent Scheduling (SPS) is described. Section 11.1.2 of 3GPP TS 36.300 V15.2.0 (2018-06) and Section 5.10 of 3GPP TS 36.321 V15.2.0 (2018-07) can be referred.

E-UTRAN can allocate a semi-persistent uplink resource or autonomous uplink resource for the first HARQ transmissions and potentially retransmissions to UEs. RRC defines the periodicity of the semi-persistent uplink grant or the bitmap of the autonomous uplink grant. PDCCH indicates whether the uplink grant is a semi-persistent one or an autonomous uplink one i.e., whether it can be implicitly reused in the following Transmission Time Intervals (TTIs) according to the periodicity or the bitmap defined by RRC.

In the TTIs where the UE has semi-persistent uplink resource or autonomous uplink resource, if the UE cannot find its Cell Radio Network Temporary Identifier (C-RNTI) on the PDCCH(s), an uplink transmission according to the semi-persistent allocation or autonomous uplink allocation that the UE has been assigned in the TTI can be made. The network performs decoding of the pre-defined Physical Resource Blocks (PRBs) according to the pre-defined Modulation and Coding Scheme (MCS). Otherwise, in the TTIs where the UE has semi-persistent uplink resource or autonomous uplink resource, if the UE finds its C-RNTI on the PDCCH(s), the PDCCH allocation overrides the persistent allocation or autonomous uplink allocation for that TTI and the UE's transmission follows the PDCCH allocation, not the semi-persistent allocation or autonomous uplink. Retransmissions are either implicitly allocated in which case the UE uses the semi-persistent uplink allocation or autonomous uplink allocation, or explicitly allocated via PDCCH(s) in which case the UE does not follow the semi-persistent allocation or autonomous uplink allocation.

There is no blind decoding in uplink and when the UE does not have enough data to fill the allocated resource, padding is used.

Semi-persistent uplink resources can be configured. Multiple UL SPS configurations are supported per serving cell. On one serving cell, multiple such configurations can be active simultaneously only for the same TTI length. SPS configurations can also be active simultaneously for different cells. PDCCH allocations made on a given serving cell can only override the semi-persistent allocation for that serving cell.

When UL skipping is configured, the UE will not transmit a MAC PDU with only padding Buffer Status Reporting (BSR) and padding if no data is available for transmission in the UE buffer. When UL Skipping and an SPS interval shorter than 10 ms is configured, a retransmission is prioritized over a new transmission on semi-persistent uplink resources if no dynamic grant is allocated for that subframe.

For a UE capable of Vehicle-to-everything (V2X) communication, multiple semi-persistent configurations can be configured in uplink, regardless of the specific services the UE is operating. The uplink resources for each semi-persistent configuration can only be configured for the Primary Cell (PCell). When Dual Connectivity (DC) is configured, the uplink resources for each semi-persistent configuration can only be configured for the PCell or Primary Secondary Cell (PSCell).

For NB-IoT, E-UTRAN can allocate semi-persistent uplink resource for sending a BSR acting as a scheduling Request.

When SPS is enabled by RRC, the following information is provided:
SPS C-RNTI or UL SPS V-RNTI;
Uplink SPS interval semiPersistSchedIntervalUL if short TTI in UL for the Special Cell (SpCell) is not configured or semiPersistSchedIntervalUL-sTTI in UL for the SpCell if short TTI is configured and number of empty transmissions before implicit release implicitReleaseAfter, if SPS with SPS C-RNTI is enabled for the uplink;
Uplink SPS interval semiPersistSchedIntervalUL and number of empty transmissions before implicit release implicitReleaseAfter for each SPS configuration, if SPS with UL SPS V-RNTI is enabled for the uplink;
Whether twoIntervalsConfig is enabled or disabled for uplink, only for TDD;
Downlink SPS interval semiPersistSchedIntervalDL if short TTI in DL for the SpCell is not configured or semiPersistSchedIntervalDL-sTTI if short TTI in DL for the SpCell is configured and number of configured HARQ processes for SPS numberOfConfSPS-Processes, if SPS is enabled for the downlink;
sTTIStartTimeDl if short TTI in DL for the SpCell is configured and sTTIStartTimeUl if short TTI in UL for the SpCell is configured;

Uplink configured grant is described. Section 10.3 of 3GPP TS 38.300 V15.2.0 (2018-06) and Section 5.8.2 of 3GPP TS 38.321 V15.2.0 (2018-06) can be referred.

With configured grants, the gNB can allocate uplink resources for the initial HARQ transmissions to UEs. Two types of configured uplink grants are defined:
With Type 1, RRC directly provides the configured uplink grant (including the periodicity).
With Type 2, RRC defines the periodicity of the configured uplink grant while PDCCH addressed to Configured Scheduling RNTI (CS-RNTI) can either signal and activate the configured uplink grant, or deactivate it. That is, a PDCCH addressed to CS-RNTI indicates that the uplink grant can be implicitly reused according to the periodicity defined by RRC, until deactivated.

When a configured uplink grant is active, if the UE cannot find its C-RNTI/CS-RNTI on the PDCCH(s), an uplink transmission according to the configured uplink grant can be made. Otherwise, if the UE finds its C-RNTI/CS-RNTI on the PDCCH(s), the PDCCH allocation overrides the configured uplink grant.

Retransmissions other than repetitions are explicitly allocated via PDCCH(s).

When Carrier Aggregation (CA) is configured, at most one configured uplink grant can be signaled per serving cell. When Bandwidth Adaptation (BA) is configured, at most one configured uplink grant can be signaled per Bandwidth Part (BWP). On each serving cell, there can be only one configured uplink grant active at a time. A configured uplink grant for one serving cell can either be of Type 1 or Type 2. For Type 2, activation and deactivation of configured uplink grants are independent among the serving cells. When Supplemental Uplink (SUL) is configured, a configured uplink grant can only be signaled for one of the 2 ULs of the cell.

RRC configures the following parameters when the configured grant Type 1 is configured:
cs-RNTI: CS-RNTI for retransmission;
periodicity: periodicity of the configured grant Type 1;
timeDomainOffset: Offset of a resource with respect to SFN=0 in time domain;
timeDomainAllocation: Allocation of configured uplink grant in time domain which contains startSymbolAndLength;
nrofHARQ-Processes: the number of HARQ processes.

RRC configures the following parameters when the configured grant Type 2 is configured:
cs-RNTI: CS-RNTI for both activation, deactivation, and retransmission;
periodicity: periodicity of the configured grant Type 2;
nrofHARQ-Processes: the number of HARQ processes.

Unified Access Control (UAC) is described. Section 7.4 of 3GPP TS 38.300 V15.2.0 (2018-06) can be referred.

One unified access control framework is applied for NR. For each access attempt, one access category and one or more access identities are selected.

NG-RAN broadcasts barring control information associated with access categories and access identities and the UE determines whether an identified access attempt is authorized or not, based on the broadcasted barring information and the selected access category and access identities. In the case of multiple core networks sharing the same NG-RAN, the NG-RAN provides broadcasted barring control information for each PLMN individually.

The unified access control framework is applicable to all UE states (RRC_IDLE, RRC_INACTIVE and RRC_CONNECTED).

For NAS triggered requests, the UE NAS determines one access category and access identity(ies) for the given access attempt and provides them to RRC for access control check. The RRC performs access barring check based on the access control information and the determined access category and access identities. The RRC indicates whether the access attempt is allowed or not to NAS layer. The NAS also performs the mapping of the access category and access identity(ies) associated with the access attempt to establishment cause and provides the establishment cause to RRC for inclusion in connection request to enable the gNB to decide whether to reject the request.

For AS triggered request (i.e., RNA update), the RRC determines the resume cause value and the corresponding access category.

Upon initiation of the UAC procedure, the UE shall:
1> if timer T390 is running for the Access Category:
2> consider the access attempt as barred;
1> if timer T302 is running and the Access Category is neither '2' nor '0':
2> consider the access attempt as barred;
1> else:
2> if the Access Category is '0':
3> consider the access attempt as allowed;
2> else:
3> if SIB1 includes uac-BarringPerPLMN-List and the uac-BarringPerPLMN-List contains an UAC-BarringPerPLMN entry with the plmn-IdentityIndex corresponding to the PLMN selected by upper layers:
4> select the UAC-BarringPerPLMN entry with the plmn-IdentityIndex corresponding to the PLMN selected by upper layers;
4> in the remainder of this procedure, use the selected UAC-BarringPerPLMN entry (i.e. presence or absence of access barring parameters in this entry) irrespective of the common access barring parameters included in SIB1;
3> else
4> in the remainder of this procedure use the common access barring parameters (i.e. presence or absence of these parameters) included in SIB1;
3> if the uac-ACBarringListType indicated that uac-ExplicitACBarringList is used:
4> if the corresponding UAC-BarringPerCatList contains a UAC-BarringPerCat entry corresponding to the access category:
5> select the UAC-BarringPerCat entry;
5> if the uac-BarringInfoSetList contain a UAC-BarringInfoSet entry corresponding to the uac-barringInfoSetIndex in the UAC-BarringPerCat:
6> select the UAC-BarringInfoSet entry;
6> perform access barring check for the access category, using the UAC-BarringInfoSet as "UAC barring parameter";
5> else:
6> consider the access attempt as allowed;
4> else:
5> consider the access attempt as allowed;
3> select the UAC-BarringInfoSetIndex entry from uac-ImplicitACBarringList entry corresponding to the access category;
4> perform access barring check for the access category, using uac-BarringInfo corresponding to UAC-BarringInfoSetIndex as "UAC barring parameter";
1> if the access barring check was requested by RRC for an RRC establishment or for an RRC resumption requested by upper layers; or
1> if the access barring check was requested by upper layers:
2> if the access attempt is considered as barred:
3> inform upper layers that the access attempt for the access category is barred, upon which the procedure ends;
2> else:
3> inform upper layers that the access attempt for the access category is allowed, upon which the procedure ends;
1> else:
2> the procedure ends;
The UE shall:
1> if cell reselection occurs while T390 is running:
2> stop timer T390 for all access categories;

The UE shall:
1> if timer T302 expires or is stopped, and if timer T390 corresponding to an access category is not running; or
1> if timer T390 corresponding to an access category expires or is stopped, and if timer T302 is not running:
2> consider the barring for this access category to be alleviated;
1> When barring for an access category is considered being alleviated:
2> if the access category was provided upon access barring check requested by upper layers:
3> inform upper layers about barring alleviation for the access category;
The UE shall:
1> if one or more access identities are indicated by upper layers or obtained by the RRC layer, and
1> if for at least one of these access identities the corresponding bit in the uac-BarringForAccessIdentity contained in "UAC barring parameter" is set to zero:
2> consider the access attempt as allowed;
1> else:
2> draw a random number 'rand' uniformly distributed in the range: 0≤rand<1;
2> if 'rand' is lower than the value indicated by uac-BarringFactor included in "UAC barring parameter":
3> consider the access attempt as allowed;
2> else:
3> consider the access attempt as barred;
1> if the access attempt is considered as barred:
2> draw a random number 'rand' that is uniformly distributed in the range 0<rand<1;
2> start timer T390 for the Access Category with the timer value calculated as follows, using the uac-BarringTime included in "AC barring parameter":
"Tbarring"=(0.7+0.6*rand)*uac-BarringTime;

As mentioned above, when the wireless device intends to transmit data in RRC_CONNECTED, the wireless device may perform access control first. Only when the access is allowed by the result of the access control, the wireless device may establish a connection with the network and then transmit data to the network in RRC_CONNECTED.

Specifically, the wireless device acquires UAC information through system information. UAC information may include barring information (barring factor and barring time) for each access category. When the wireless device in RRC_CONNECTED (and/or in RRC_IDLE and/or RRC_INACTIVE) triggers a connection request for data transmission for a specific access category, the wireless device determines whether to bar or not with a barring factor corresponding to the access category (i.e., access barring check). As a result of the access barring check, if the connection request is allowed, data transmission for the specific category can be continuously allowed while the connection is maintained in RRC_CONNECTED.

Meanwhile, it has been discussed that the wireless device may transmit data in RRC_IDLE and/or RRC_INACTIVE. In LTE Rel-16 enhanced MTC (eMTC)/NB-IoT, data transmission in RRC_IDLE through Pre-allocated UL Resource (PUR) is under discussion. Furthermore, data transmission in RRC_INACTIVE is also being discussed in NR Rel-17.

When the wireless device intends to transmit data in RRC_IDLE and/or RRC_INACTIVE, it is not clear when and/or how to perform access control. Even when the access attempt is allowed by the result of the access control, it is not clear how long the data transmission takes in RRC_IDLE and/or RRC_INACTIVE. In general, the wireless device may stay in RRC_IDLE and/or RRC_INACTIVE mode for a long time. When data transmission is allowed in RRC_IDLE and/or RRC_INACTIVE, once the access barring check for a specific category is passed, the data for the specific category can be transmitted for a long time. Therefore, it is difficult to cope with UL congestion situation.

Figure 10:
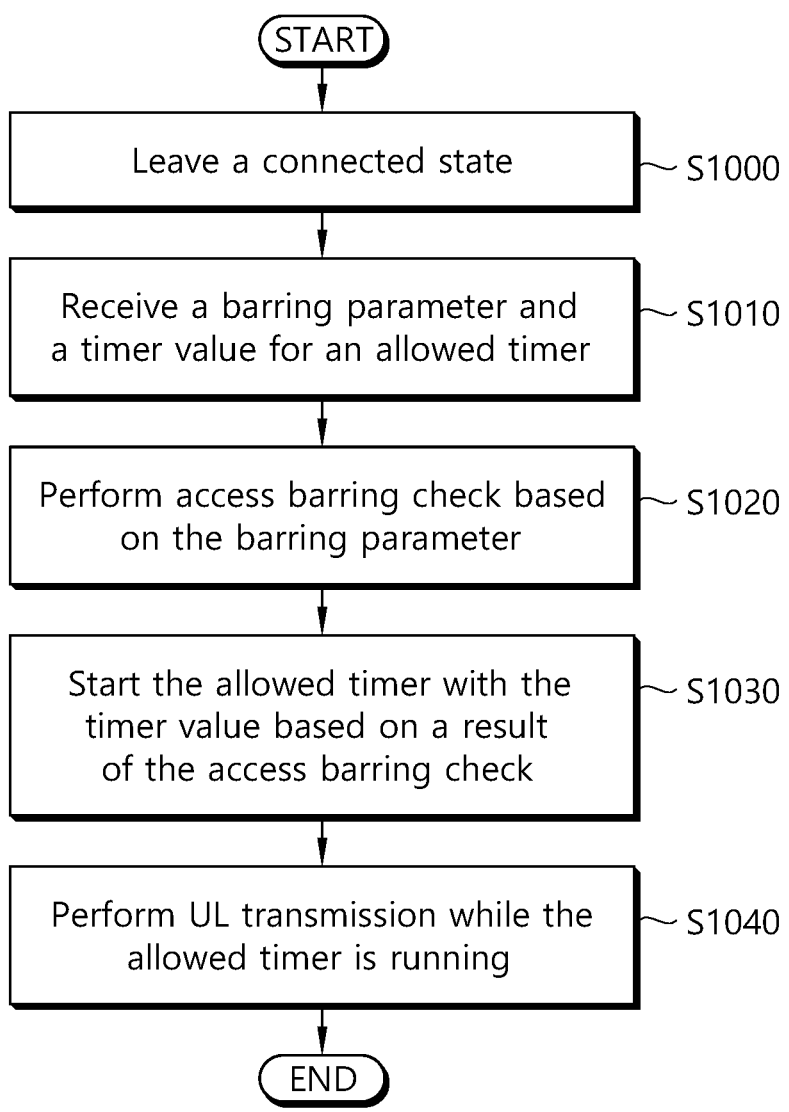
FIG. 10 shows an example of a method for access control for data transmission according to an embodiment of the present disclosure.

FIG. 10 shows an example of a method for access control for data transmission according to an embodiment of the present disclosure.

In step S1000, the wireless device leaves a connected state. Upon leaving the connected state (e.g., RRC_CONNECTED), the wireless device may enter an idle sate (e.g., RRC_IDLE) and/or an inactive state (e.g., RRC_INACTIVE).

In step S1010, the wireless device receives a barring parameter and a timer value for an allowed timer. The barring parameter and the timer value for the allowed timer may be received via system information and/or dedicated signaling. The barring parameter may include barring factor and barring time.

In some implementations of the present disclosure, the barring parameter may be configured for each logical channel or each configured grant or each SPS configuration. The barring parameter may be configured for each access category.

In some implementations of the present disclosure, the barring parameter may further include a scaling factor. The scaling factor may be based on size of the MAC PDU and/or an amount of data available for UL transmission.

In some implementations of the present disclosure, information on allowed amount of data may be further received. That is, the allowed amount of data may be further configured.

In step S1020, the wireless device performs access barring check based on the barring parameter.

In some implementations of the present disclosure, when data becomes available for transmission and/or a MAC PDU is constructed for a logical channel or the configured grant or SPS configuration applicable for access barring check, the wireless device which left the connected state (i.e., in the idle state and/or inactive state) may perform access barring check based on the barring factor included in the barring parameter for the logical channel or the configured grant or the SPS configuration.

In some implementations of the present disclosure, the data and/or MAC PDU may be mapped to a specific access category. The access barring check may be performed based on the barring parameter for the specific access category.

In some implementations of the present disclosure, the barring parameter may be scaled based on the scaling factor if configured in the barring parameter. That is, the barring parameter (e.g., barring factor and/or barring time) may be scaled (e.g., scaled down and/or scaled up) depending on the size of the MAC PDU and/or the amount of data available for UL transmission by using the scaling factor.

In step S1030, the wireless device starts the allowed timer with the timer value based on a result of the access barring check.

In some implementations of the present disclosure, the allowed timer may be started upon the access barring check being successful. The access barring check may not be performed while the allowed timer is running.

In some implementations of the present disclosure, if access attempt is allowed as the result of the access barring check for the logical channel or the configured grant or the SPS configuration, the wireless device starts the allowed timer with the timer value.

In some implementations of the present disclosure, the allowed timer may be scaled based on the scaling factor. That is, the time value for the allowed timer may be scaled (e.g., scaled down and/or scaled up) depending on the size of the MAC PDU and/or the amount of data available for UL transmission by using the scaling factor.

In step S1040, the wireless device performs UL transmission while the allowed timer is running. The UL transmission may be performed in an idle state (e.g., RRC_IDLE) and/or inactive state (e.g., RRC_INACTIVE).

In some implementations of the present disclosure, the wireless device performs UL transmission of the corresponding MAC PDU and/or other transmissions from the logical channel or the configured grant or the SPS configuration. The wireless device may consider that UL transmissions from the logical channel or the configured grant or the SPS configuration are allowed at the cell or the validity area while the allowed timer is running.

In some implementations of the present disclosure, upon expiry of the allowed timer, the access barring check may be performed and the UL transmission may be stopped.

In some implementations of the present disclosure, if the allowed amount of data is configured, amount of transmitted data may be calculated. Until sum of the transmitted data reaches to the allowed amount of data, the access barring check may not be performed and access attempt may be allowed.

Alternatively, in some implementations of the present disclosure, a barring timer may be started with the barring time included in the barring parameter upon the access barring check being unsuccessful. The UL transmission may be delayed until the barring timer expires.

In some implementations of the present disclosure, if access attempt is not allowed as the result of the access barring check for the logical channel or the configured grant or the SPS configuration, the wireless device starts the barring timer. While the barring timer is running, the wireless device may delay UL transmission of the corresponding MAC PDU and/or other transmissions from the logical channel or the configured grant or the SPS configuration. The wireless device may consider that UL transmissions from the logical channel or the configured grant or the SPS configuration are not allowed at the cell or the validity area while the barring timer is running.

In some implementations of the present disclosure, the wireless device may be in communication with at least one of a mobile device, a network, and/or autonomous vehicles other than the wireless device.

Figure 11:
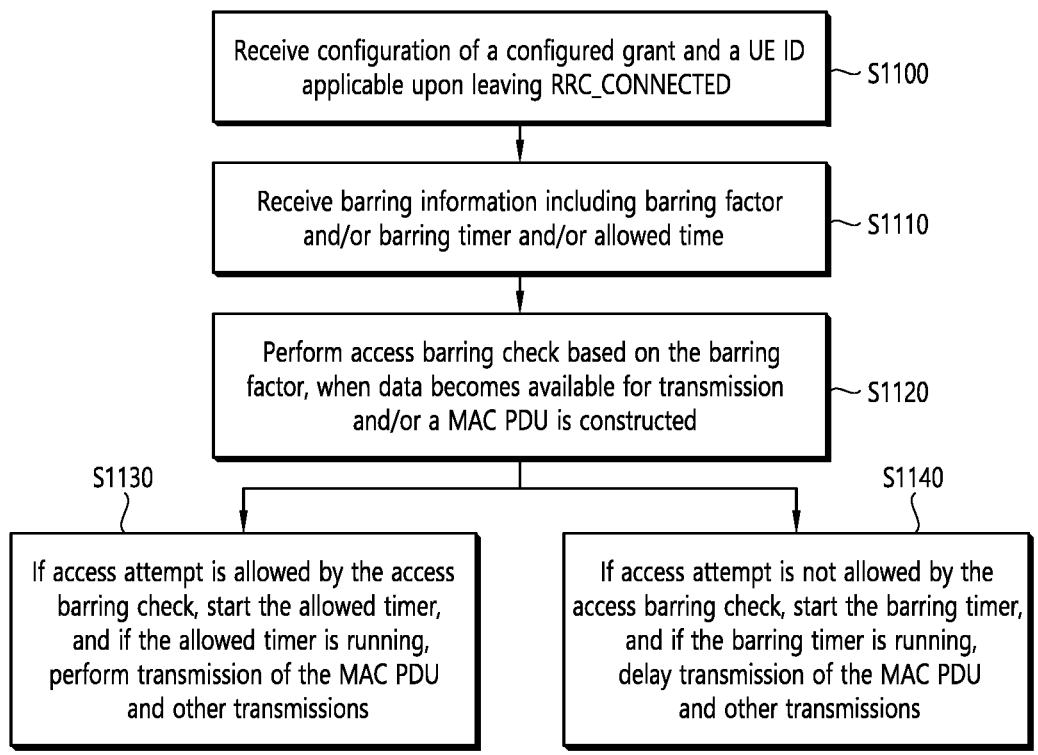
FIG. 11 shows another example of a method for access control for data transmission according to an embodiment of the present disclosure.

FIG. 11 shows another example of a method for access control for data transmission according to an embodiment of the present disclosure.

In step S1100, the wireless device leaves RRC_CONNECTED. Upon leaving RRC_CONNECTED from the network, the wireless device receives configuration of a configured grant and/or ID of the wireless device applicable.

In some implementations of the present disclosure, the configured grant may be a resource for a SPS configuration. The UE ID may be SPS-I-RNTI.

In some implementations of the present disclosure, the configuration may include a validity timer associated with the configured grant. The configured grant may be valid while the validity timer is running.

In some implementations of the present disclosure, the configuration may also include a validity area associated with the configured grant. The validity area may consist of one or more cells. The configured grant may be valid when the wireless device is located in the validity area.

In some implementations of the present disclosure, the configuration may indicate which logical channel and/or configured grant is applicable for access barring check.

In step S1110, the wireless device receives barring information and allowed time. The barring information may include barring factor and barring time. The barring information and the allowed time may be received via system information or dedicated signaling at a cell.

In some implementations of the present disclosure, the barring information may be configured for each logical channel or each configured grant or each SPS configuration. The barring parameter may be configured for each access category.

In some implementations of the present disclosure, the barring information may additionally include a scaling factor.

In step S1120, the wireless device in RRC_IDLE and/or RRC_INACTIVE performs access barring check based on the barring factor for the logical channel or the configured grant or the SPS configuration.

In some implementations of the present disclosure, when data becomes available for transmission and/or a MAC PDU is constructed for a logical channel or the configured grant or SPS configuration applicable for access barring check, the wireless device may perform access barring check based on the barring factor for the logical channel or the configured grant or the SPS configuration.

In some implementations of the present disclosure, the data and/or MAC PDU may be mapped to a specific access category. The access barring check may be performed based on the barring parameter for the specific access category.

In some implementations of the present disclosure, the barring factor, the barring time and/or the allowed time may be scaled down and/or scaled up depending on the size of the MAC PDU and/or the amount of data available for transmission by using the scaling factor.

In step S1130, if access attempt is allowed as the result of the access barring check, the wireless device starts the allowed timer, and while the allowed timer is running, the wireless device performs UL transmission.

In some implementations of the present disclosure, if access attempt is allowed as the result of the access barring check for the logical channel or the configured grant or the SPS configuration, the wireless device may start the allowed timer, and if the allowed timer is running, the wireless device may perform transmission of the corresponding MAC PDU and/or other transmissions from the logical channel or the configured grant or the SPS configuration.

In some implementations of the present disclosure, the wireless device may consider that UL transmissions from the logical channel or the configured grant or the SPS configuration are allowed at the cell or the validity area during the allowed time.

In step S1140, if access attempt is not allowed as the result of the access barring check, the wireless device starts the barring timer, and while the barring timer is running, the wireless device delays UL transmission.

In some implementations of the present disclosure, if access attempt is not allowed as the result of the access barring check for the logical channel or the configured grant or the SPS configuration, the wireless device may start the allowed timer, and if the barring timer is running, the wireless device may delay transmission of the corresponding MAC PDU and/or other transmissions from the logical channel or the configured grant or the SPS configuration.

In some implementations of the present disclosure, the wireless device may consider that UL transmissions from the logical channel or the configured grant or the SPS configuration are not allowed at the cell or the validity area during the barring time.

Figure 12:
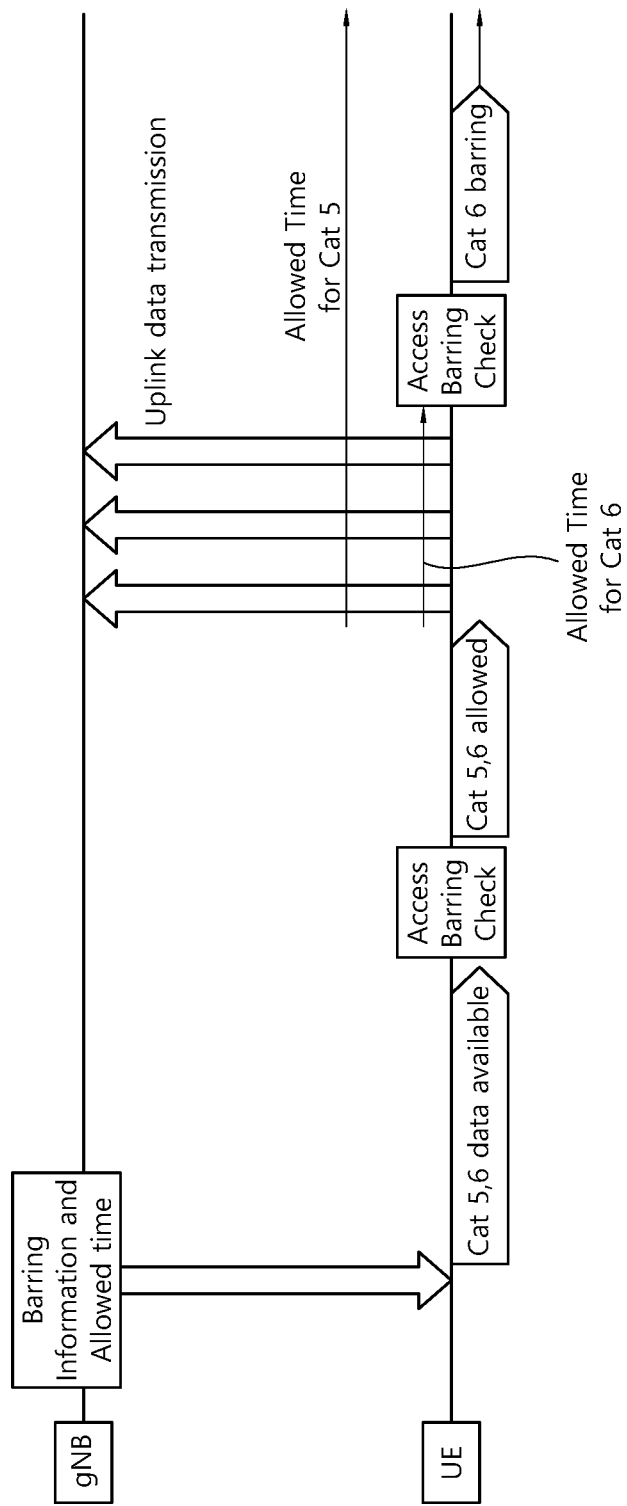
FIG. 12 shows an example of access control for data transmission according to an embodiment of the present disclosure.

FIG. 12 shows an example of access control for data transmission according to an embodiment of the present disclosure.

Referring to FIG. 12, the wireless device receives barring information and allowed time from the network.

When data for access category 5 and access category 6 is available for transmission, the wireless device performs access barring check for the access category 5 and access category 6, based on the barring information for access category 5 and access category 6, respectively.

If access attempt is allowed for the access category 5 and access category 6 as a result of the access barring check, the allowed timer for the access category 5 and access category 6 is started respectively. While the allowed timer for the access category 5 and access category 6 is running, data for the access category 5 and access category 6 is transmitted to the network.

If the allowed timer for the access category 6 expires, the wireless device performs access barring check for the access category 6 based on the barring information for the access category 6. If the access attempt is not allowed for the access category 6 as a result of the access barring check, the barring timer for the access category 6 is stared. While the barring timer for the access category 6 is running, data transmission for the access category 6 is prohibited.

Figure 13:
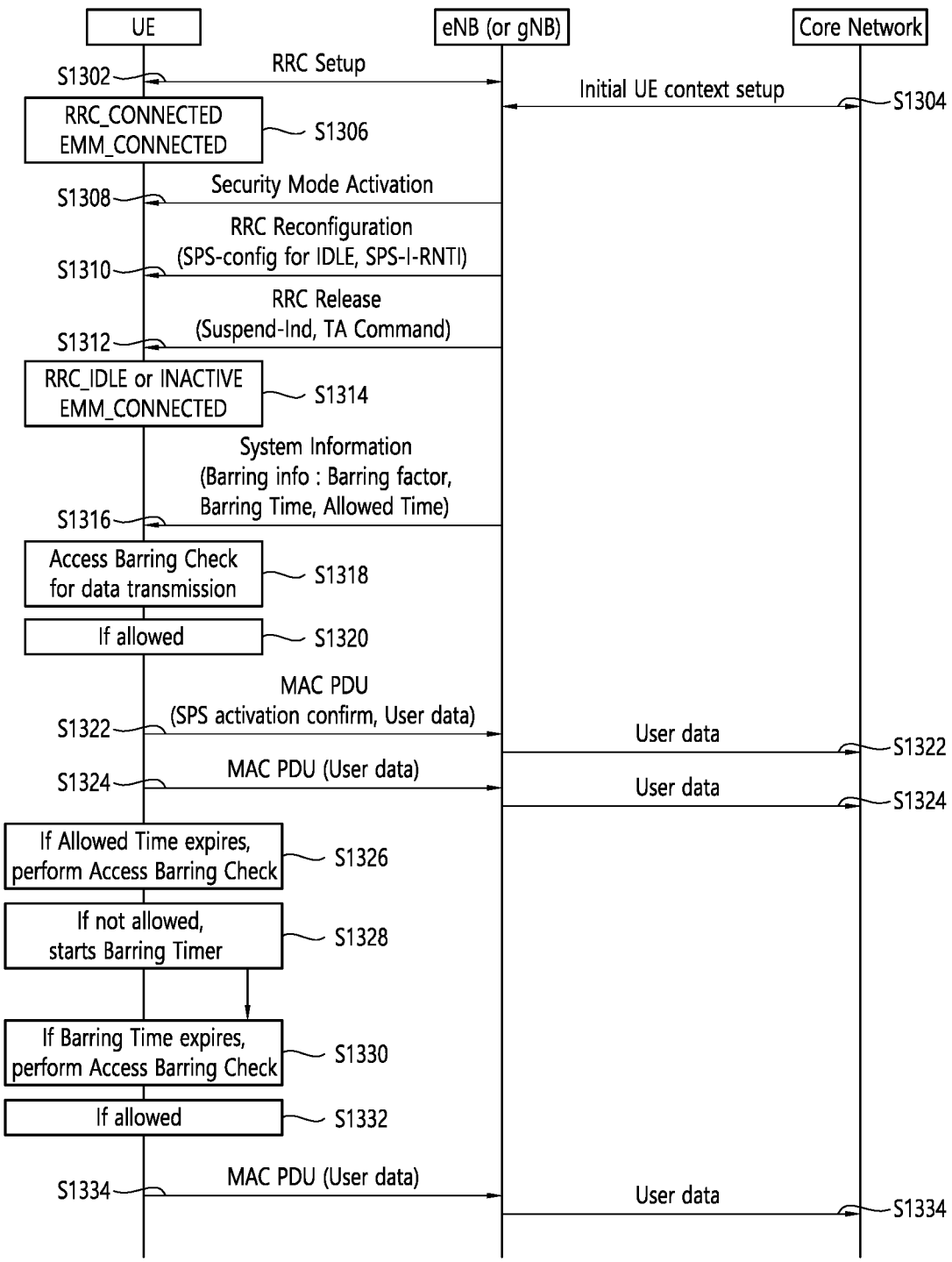
FIG. 13 shows another example of a method for access control for data transmission according to an embodiment of the present disclosure.

FIG. 13 shows another example of a method for access control for data transmission according to an embodiment of the present disclosure.

In step S1302, the UE and gNB performs RRC setup. In step S1304, the gNB and core network performs initial UE context setup. In step S1306, the UE enters RRC_CONNECTED and EMM_CONNECTED at a serving cell.

In step S1308, the UE performs Security Mode Activation to activate AS security. In step S1310, the UE performs RRC connection reconfiguration to configure SPS configuration. The UE may receive SPS configuration via system information regardless of RRC state.

In some implementations of the present disclosure, the SPS configuration may include at least one of UL and/or DL SPS resources as UL and/or DL configured grants, PRB or narrowband index, a validity area, a validity timer, valid logical channels, maximum amount of data (or maximum data rate) supported by the configured grant, and/or UE identity such as SPS-I-RNTI.

In some implementations of the present disclosure, the SPS-I-RNTI may be used for data transmission with the configured grant in RRC_IDLE and/or RRC_INACTIVE.

In some implementations of the present disclosure, the SPS configuration and/or the configured grant may be valid in the PRB and/or narrowband indicated by the index while the UE is in RRC_IDLE and/or RRC_INACTIVE. RRC Release or Paging or MAC Control Element (CE) or PDCCH received in RRC_IDLE and/or RRC_INACTIVE may indicate SPS activation with a PRB index and/or a narrowband index for a particular configured grant. Upon receiving the SPS activation with a PRB index and/or a narrowband index, the UE in RRC_IDLE or RRC_INACTIVE may consider the SPS configuration and/or the configured grant as activated on the PRB and/or the narrowband indicated by the index.

In some implementations of the present disclosure, the validity area may include one or more cells including the serving cell. The configured grant may be valid in the validity area.

In some implementations of the present disclosure, the configured grant may be valid while the validity timer is running. The validity timer may be a Time Alignment Timer (TAT) and/or another timer. The validity timer may be configured for each configured grant. The UE may start or restart the validity timer (e.g., TAT) when the configured grant is received and/or when the UE leaves RRC_CONNECTED and/or when Timing Advance Command (TAC) is received e.g., via MAC CE, Random Access Response (RAR), RRC Release message, or Paging message in RRC_IDLE and/or RRC_INACTIVE after leaving RRC_CONNECTED. The network may periodically send TAC to the UE in RRC_IDLE and/or RRC_INACTIVE, e.g., by paging message in UE's PO and/or MAC CE via DL configured grant.

In some implementations of the present disclosure, the configured grant may be valid only for the valid logical channels. Thus, only when the UE transmits data from the valid logical channel, the UE can use the configured grant to transmit data.

In step S1312, the UE receives RRC Release message, and leaves RRC_CONNECTED. Upon receiving the RRC Release message, in step S1314, the UE goes to RRC_IDLE. The RRC Release message may include a suspend indication. Upon receiving the RRC Release message including the suspend indication, in step S1314, the UE goes to RRC_INACTIVE. The RRC Release message may include a suspend indication.

In some implementations of the present disclosure, the RRC Release message may include Timing Advance (TA) command. Upon receiving the TA command, the UE in RRC_IDLE and/or RRC_INACTIVE starts TAT.

In some implementations of the present disclosure, the UE may monitor UE's PO. If the UE receives paging indicating the UE ID, a paging cause indicating TA, and TA command from the network, the UE may apply the TA Command and starts or restarts a TAT. The Paging may be a Paging message or an indication included in Downlink Control Information (DCI) of the PDCCH. TA Command may indicate a TA value which the UE should apply. The paging may also indicate a RACH preamble resource such as Random Access Preamble ID (RAPID) and/or time/frequency resource.

In some implementations of the present disclosure, upon receiving the paging, the UE may initiate UL transmission to send a confirmation to the network. But, the UE keeps staying in RRC_IDLE and/or RRC_INACTIVE. The confirmation may be the RACH preamble resource, an RRC message and/or a MAC CE indicating the UE ID and confirmation of TA. The confirmation may be transmitted via a RACH procedure or the configured grant.

In some implementations of the present disclosure, upon receiving the paging indicating UL and/or DL SPS activation with the UE ID and paging cause indicating SPS activation, the UE may activates the SPS. When the UE receives paging indicating the UE ID for other purpose (e.g., with a paging cause not indicating TA), the UE may initiate UL transmission to enter RRC_CONNECTED.

In step S1316, while in RRC_IDLE and/or RRC_INACTIVE, the UE receives barring information including barring factor and barring time, and allowed time via system information.

In some implementations of the present disclosure, if the RRC Release message indicates UL SPS activation for a particular configured grant, when data becomes available for UL transmission in RRC_IDLE and/or RRC_INACTIVE, the UE may construct a MAC PDU. The MAC PDU may include SPS confirmation MAC CE with user data. The SPS confirmation MAC CE may indicate which configured grant(s) is activated or deactivated.

In step S1318, before transmitting the MAC PDU by using contention based configured grant, the UE in RRC_IDLE and/or RRC_INACTIVE performs access barring check to determine whether or not to perform transmission of the MAC PDU via the configured grant based on barring information received from system information.

In some implementations of the present disclosure, when data becomes available for transmission and/or the MAC PDU is constructed for a logical channel or the configured grant applicable for access barring check, the UE in RRC_IDLE and/or RRC_INACTIVE may perform access barring check by using the barring factor. Which logical channel and/or the configured grant is applicable for access barring check may be included in the SPS configuration received from the network.

If access attempt is allowed as the result of access barring check in step S1320, the UE in RRC_IDLE and/or RRC_INACTIVE performs UL transmissions, i.e., transmission of the MAC PDU, by using the configured grant in step S1322/S1324.

In some implementations of the present disclosure, the configured grant may be either contention based or contention free. The UE in RRC_IDLE and/or RRC_INACTIVE should transmit data with UE ID such as SPS-I-RNTI or S-TMSI in contention based configured grant. The UE in RRC_IDLE and/or RRC_INACTIVE may include UE ID in an RRC message or a MAC CE to be transmitted in UL.

In some implementations of the present disclosure, the UE may periodically transmit SPS confirmation MAC CE to inform the network which configured grant(s) is currently activated or deactivated.

In some implementations of the present disclosure, the network may indicate to the UE whether the configured grant and/or the SPS configuration requires access barring check. Thus, if indicated, the UE MAC may request UE RRC to perform access barring check before transmission of the MAC PDU via the SPS grant. Then, UE RRC may inform UE MAC about the result of the access barring check. If access attempt is allowed as the result of access barring check, UE MAC may perform transmission of the MAC PDU.

In some implementations of the present disclosure, if access attempt is allowed as the result of the access barring check, the UE starts an allowed timer. While the allowed timer is running, the UE performs transmission of the corresponding MAC PDU and/or subsequent MAC PDUs for the logical channel and/or the configured grant applicable for access barring check.

In step S1326, if the allowed timer expires, the UE performs access barring check.

In step S1328, if access attempt is not allowed as the result of the access barring check, the UE starts a barring timer. Then, the UE delays transmission of the corresponding MAC PDU and/or subsequent MAC PDUs until the barring timer expires. Then, when the barring timer expires, the UE may perform access barring check by using the barring factor and/or barring time. The barring factor and/or barring time may be scaled down and/or scaled up based on the scaling factor. If the UE performs access barring check, the UE may repeat the previously mentioned steps according to the result of the access barring check. Alternatively, when the barring timer expires, the UE may perform UL transmission for the allowed time without the access barring check.

In some implementations of the present disclosure, the UE may scale down and/or scale up at least one of the barring factor, the barring time and/or the allowed time depending on the size of the MAC PDU and/or the amount of data available for transmission. Such mapping between the size of the MAC PDU and/or the amount of data and at least one of the barring factor, the barring time and/or the allowed time may be provided by the network via dedicated signaling or system information.

For example, if the scaling factor is configured with 2.0 for a MAC PDU bigger than 1000 Kbyte and/or an L2 buffer size bigger than 1000 Kbyte, when the UE performs access barring check for transmission of the MAC PDU from a logical channel and/or a configured grant with the barring factor set to 0.4, the UE may use the scaled barring factor set to 0.8 (=0.4×2.0) for this access barring check.

For another example, if the barring/allowed time and the scaling factor are configured with 1000 ms and 0.5 respectively for a MAC PDU bigger than 1000 Kbyte and/or an L2 buffer size bigger than 1000 Kbyte, when the access attempt is not allowed as a result of access barring check for transmission of the MAC PDU from a logical channel and/or a configured grant, the UE may use the scaled barring time set to 500 ms (=1000 ms×0.5) to delay transmissions from the logical channel and/or the configured grant. When the access attempt is allowed as the result of access barring check, the UE may use the scaled allowed time set to 500 ms (=1000 ms×0.5) to perform transmissions from the logical channel and/or the configured grant.

In step S1330, if the barring timer expires, the UE performs access barring check. If access attempt is allowed as the result of the access barring check in step S1332, the UE performs transmission of the MAC PDU in step S1334, In some implementations of the present disclosure, if the UE in RRC_IDLE and/or RRC_INACTIVE should transmit a MAC PDU with UE ID such as SPS-I-RNTI or S-TMSI in contention based configured grant, UE MAC entity may consider transmission of the MAC PDU as successful after contention resolution message as well as positive HARQ feedback is received in DL.

In some implementations of the present disclosure, the UE in RRC_IDLE and/or RRC_INACTIVE may transmit data without UE ID in contention free configured grant. The UE may not need to perform access barring check before transmitting MAC PDU by using the contention free configured grant. In this case, UE MAC entity may consider transmission of the MAC PDU as successful after positive HARQ feedback is received in DL without contention resolution message.

In some implementations of the present disclosure, when the UE goes to RRC_IDLE and/or RRC_INACTIVE by receiving RRC Release message, the RRC Release message may indicate DL SPS activation for a particular configured grant. Then, the UE may activate the DL SPS configured grant. When data becomes available for DL transmission in RRC_IDLE and/or RRC_INACTIVE, the network may send user data by using the DL SPS configured grant. The network may indicate to the UE that the DL SPS is deactivated by sending paging, MAC CE or PDCCH to the UE in RRC_IDLE and/or RRC_INACTIVE.

In some implementations of the present disclosure, when the UE goes to RRC_IDLE and/or RRC_INACTIVE by receiving RRC Release message, the RRC Release message may indicate DL SPS deactivation for a particular configured grant. Or, the network may indicate to the UE that the DL SPS is deactivated by sending paging, MAC CE or PDCCH to the UE in RRC_IDLE and/or RRC_INACTIVE.

In this case, the network may indicate to the UE that the DL SPS is activated by sending paging, MAC CE or PDCCH to the UE in RRC_IDLE and/or RRC_INACTIVE. Then, the UE may receive DL data via the configured grant.

In some implementations of the present disclosure, when the TAT expires, or when the validity timer expires, or when the UE leaves the validity area, or when data becomes available for a logical channel not mapped to the SPS configuration or the SPS configured grant, or when data becomes available and the amount of data available for transmission is beyond the maximum amount of data (or the maximum data rate), the UE may initiate random access procedure to perform EDT procedure or RRC connection establishment procedure or RRC resume procedure. So, the UE may transmit RACH preamble with a RAPID. In addition, the UE may deactivate the corresponding configured grant or suspend the SPS configuration or release the SPS configuration. The RAPID may be associated with the SPS configuration or the configured grant.

In some implementations of the present disclosure, in response to the RACH preamble, the network sends RAR message to the UE. The RAR message may include RAPID, TA command, and/or SPS-I-RNTI. In addition, the RAR message may indicate which type of message 3 the UE should send (e.g., EarlyDataRequest, RRCConnectionRequest or RRCResumeRequest) or which procedure the UE should trigger for message 3 (e.g., EDT procedure, RRC connection establishment procedure or RRC resume procedure).

In some implementations of the present disclosure, based on the RAR message, the UE transmits message 3, e.g., one of EarlyDataRequest, RRCConnectionRequest or RRCResumeRequest, possibly with user data. In message 4, the UE may receive SPS reconfiguration and new SPS-I-RNTI. If the UE enters RRC_CONNECTED after receiving the message 4, the UE may transmit user data in RRC_CONNECTED.

Figure 14:
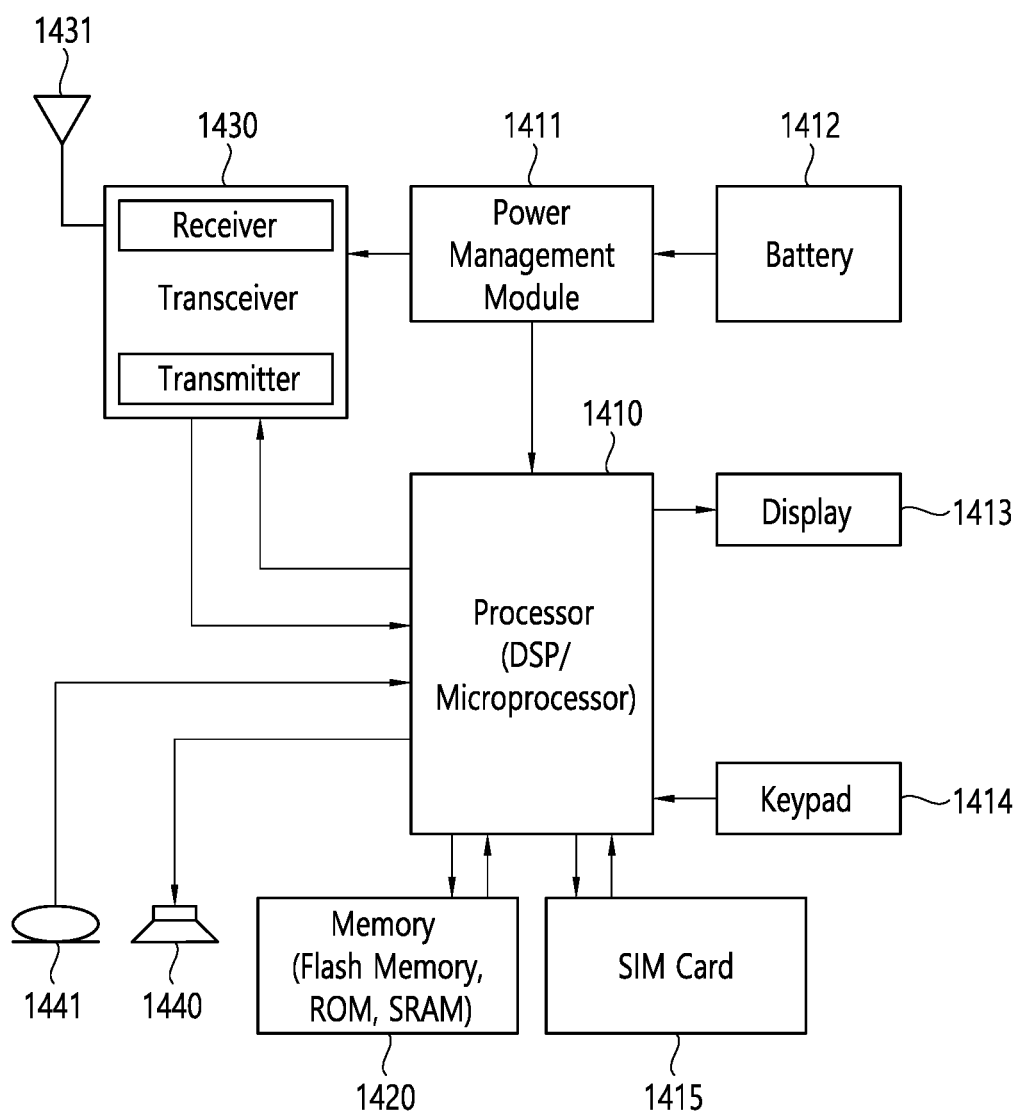
FIG. 14 shows a UE to which the technical features of the present disclosure can be applied.

FIG. 14 shows a UE to which the technical features of the present disclosure can be applied.

A UE includes a processor 1410, a power management module 1411, a battery 1412, a display 1413, a keypad 1414, a subscriber identification module (SIM) card 1415, a memory 1420, a transceiver 1430, one or more antennas 1431, a speaker 1440, and a microphone 1441.

The processor 1410 may be configured to implement proposed functions, procedures and/or methods described in this description. Layers of the radio interface protocol may be implemented in the processor 1410. The processor 1410 may include application-specific integrated circuit (ASIC), other chipset, logic circuit and/or data processing device. The processor 1410 may be an application processor (AP). The processor 1410 may include at least one of a digital signal processor (DSP), a central processing unit (CPU), a graphics processing unit (GPU), a modem (modulator and demodulator). An example of the processor 1410 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1410 may be configured to perform the steps described in FIG. 10 (i.e., steps S1000 to S1040) and/or FIG. 11 (i.e., steps S1100 to S1140). Alternatively, the processor 1410 may be configured to control the memory 1420 and/or the transceiver 1430 to perform the steps described in FIG. 10 (i.e., steps S1000 to S1040) and/or FIG. 11 (i.e., steps S1100 to S1140).

The power management module 1411 manages power for the processor 1410 and/or the transceiver 1430. The battery 1412 supplies power to the power management module 1411. The display 1413 outputs results processed by the processor 1410. The keypad 1414 receives inputs to be used by the processor 1410. The keypad 1414 may be shown on the display 1413. The SIM card 1415 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1420 is operatively coupled with the processor 1410 and stores a variety of information to operate the processor 1410. The memory 1420 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1420 and executed by the processor 1410. The memory 1420 can be implemented within the processor 1410 or external to the processor 1410 in which case those can be communicatively coupled to the processor 1410 via various means as is known in the art.

The transceiver 1430 is operatively coupled with the processor 1410, and transmits and/or receives a radio signal. The transceiver 1430 includes a transmitter and a receiver. The transceiver 1430 may include baseband circuitry to process radio frequency signals. The transceiver 1430 controls the one or more antennas 1431 to transmit and/or receive a radio signal.

The speaker 1440 outputs sound-related results processed by the processor 1410. The microphone 1441 receives sound-related inputs to be used by the processor 1410.

The present disclosure may be applied to various future technologies, such as AI.

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 15:
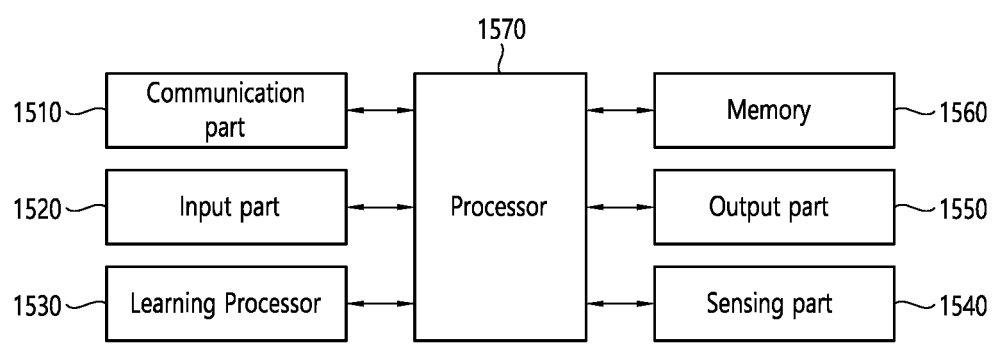
FIG. 15 shows an example of an AI device to which the technical features of the present disclosure can be applied.

FIG. 15 shows an example of an AI device to which the technical features of the present disclosure can be applied.

The AI device 1500 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 15, the AI device 1500 may include a communication part 1510, an input part 1520, a learning processor 1530, a sensing part 1540, an output part 1550, a memory 1560, and a processor 1570.

The communication part 1510 can transmit and/or receive data to and/or from external devices such as the AI devices and the AI server using wire and/or wireless communication technology. For example, the communication part 1510 can transmit and/or receive sensor information, a user input, a learning model, and a control signal with external devices. The communication technology used by the communication part 1510 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1520 can acquire various kinds of data. The input part 1520 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1520 can acquire input data to be used when acquiring an output using learning data and a learning model for model learning. The input part 1520 may obtain raw input data, in which case the processor 1570 or the learning processor 1530 may extract input features by preprocessing the input data.

The learning processor 1530 may learn a model composed of an ANN using learning data. The learned ANN can be referred to as a learning model. The learning model can be used to infer result values for new input data rather than learning data, and the inferred values can be used as a basis for determining which actions to perform. The learning processor 1530 may perform AI processing together with the learning processor of the AI server. The learning processor

1530 may include a memory integrated and/or implemented in the AI device 1500. Alternatively, the learning processor 1530 may be implemented using the memory 1560, an external memory directly coupled to the AI device 1500, and/or a memory maintained in an external device.

The sensing part 1540 may acquire at least one of internal information of the AI device 1500, environment information of the AI device 1500, and/or the user information using various sensors. The sensors included in the sensing part 1540 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1550 may generate an output related to visual, auditory, tactile, etc. The output part 1550 may include a display unit for outputting visual information, a speaker for outputting auditory information, and/or a haptic module for outputting tactile information.

The memory 1560 may store data that supports various functions of the AI device 1500. For example, the memory 1560 may store input data acquired by the input part 1520, learning data, a learning model, a learning history, etc.

The processor 1570 may determine at least one executable operation of the AI device 1500 based on information determined and/or generated using a data analysis algorithm and/or a machine learning algorithm. The processor 1570 may then control the components of the AI device 1500 to perform the determined operation. The processor 1570 may request, retrieve, receive, and/or utilize data in the learning processor 1530 and/or the memory 1560, and may control the components of the AI device 1500 to execute the predicted operation and/or the operation determined to be desirable among the at least one executable operation. The processor 1570 may generate a control signal for controlling the external device, and may transmit the generated control signal to the external device, when the external device needs to be linked to perform the determined operation. The processor 1570 may obtain the intention information for the user input and determine the user's requirements based on the obtained intention information. The processor 1570 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1530 and/or learned by the learning processor of the AI server, and/or learned by their distributed processing. The processor 1570 may collect history information including the operation contents of the AI device 1500 and/or the user's feedback on the operation, etc. The processor 1570 may store the collected history information in the memory 1560 and/or the learning processor 1530, and/or transmit to an external device such as the AI server. The collected history information can be used to update the learning model. The processor 1570 may control at least some of the components of AI device 1500 to drive an application program stored in memory 1560. Furthermore, the processor 1570 may operate two or more of the components included in the AI device 1500 in combination with each other for driving the application program.

Figure 16:
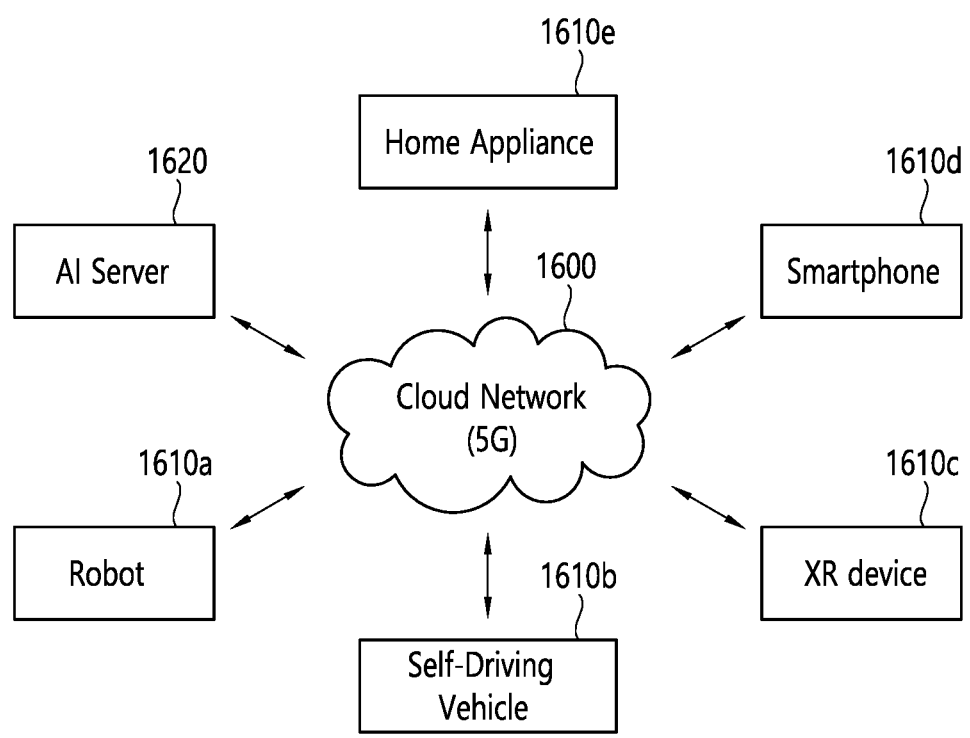
FIG. 16 shows an example of an AI system to which the technical features of the present disclosure can be applied.

FIG. 16 shows an example of an AI system to which the technical features of the present disclosure can be applied.

Referring to FIG. 16, in the AI system, at least one of an AI server 1620, a robot 1610a, an autonomous vehicle 1610b, an XR device 1610c, a smartphone 1610d and/or a home appliance 1610e is connected to a cloud network 1600. The robot 1610a, the autonomous vehicle 1610b, the XR device 1610c, the smartphone 1610d, and/or the home appliance 1610e to which the AI technology is applied may be referred to as AI devices 1610a to 1610e.

The cloud network 1600 may refer to a network that forms part of a cloud computing infrastructure and/or resides in a cloud computing infrastructure. The cloud network 1600 may be configured using a 3G network, a 4G or LTE network, and/or a 5G network. That is, each of the devices 1610a to 1610e and 1620 consisting the AI system may be connected to each other through the cloud network 1600. In particular, each of the devices 1610a to 1610e and 1620 may communicate with each other through a base station, but may directly communicate with each other without using a base station.

The AI server 1620 may include a server for performing AI processing and a server for performing operations on big data. The AI server 1620 is connected to at least one or more of AI devices constituting the AI system, i.e. the robot 1610a, the autonomous vehicle 1610b, the XR device 1610c, the smartphone 1610d and/or the home appliance 1610e through the cloud network 1600, and may assist at least some AI processing of the connected AI devices 1610a to 1610e. The AI server 1620 can learn the ANN according to the machine learning algorithm on behalf of the AI devices 1610a to 1610e, and can directly store the learning models and/or transmit them to the AI devices 1610a to 1610e. The AI server 1620 may receive the input data from the AI devices 1610a to 1610e, infer the result value with respect to the received input data using the learning model, generate a response and/or a control command based on the inferred result value, and transmit the generated data to the AI devices 1610a to 1610e. Alternatively, the AI devices 1610a to 1610e may directly infer a result value for the input data using a learning model, and generate a response and/or a control command based on the inferred result value.

Various embodiments of the AI devices 1610a to 1610e to which the technical features of the present disclosure can be applied will be described. The AI devices 1610a to 1610e shown in FIG. 16 can be seen as specific embodiments of the AI device 1500 shown in FIG. 15.

The present disclosure can have various advantageous effects.

For example, data transmission in idle state and/or inactive state can be subject to the access control.

For example, if the access attempt is allowed by the result of the access barring check, the wireless device can transmit data in idle state and/or inactive state during a time interval configured by the allowed time.

For example, if the access attempt is not allowed by the result of the access barring check, the wireless device can delay data transmission in idle state and/or inactive state during a time interval configured by the barring time.

For example, both data transmission in connected state and data transmission in idle state and/or inactive state can be treated fairly, i.e., subject to the access control.

For example, when data is transmitted in idle state and/or inactive state it is possible to control data transmission that can occur for a long time in a differentiated way per each access category according to the congestion situation.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device operating in a wireless communication system, the method comprising:
   receiving, from a network, a configuration for an uplink (UL) resource for a user data transmission in a non-connected state,
   wherein the non-connected state is a state which the wireless device enters upon receiving a connection release message from the network;
   entering the non-connected state;
   receiving, from the network, system information comprising barring information;
   based on the barring information, performing an access barring check to determine whether an access attempt to the network is allowed or barred; and
   transmitting, to the network while in the non-connected state, user data using the UL resource based on the access attempt to the network being allowed as a result of the access barring check,
   wherein the barring information in the system information comprises a timer value for a barring timer, and
   wherein the barring timer is started based on the access attempt being barred as a result of the access barring check.

2. The method of claim 1, wherein the system information further comprises a timer value for an allowed timer, and
   wherein the allowed timer is started based on the access attempt being allowed as a result of the access barring check.

3. The method of claim 2, wherein the access barring check is not performed while the allowed timer is running.

4. The method of claim 2, wherein the access barring check is performed upon expiry of the allowed timer.

5. The method of claim 2, wherein transmission of the UL user data is stopped upon expiry of the allowed timer.

6. The method of claim 1, wherein transmission of the user data is delayed until the barring timer expires.

7. The method of claim 1, wherein the barring information is configured for each logical channel or each configured grant or each semi-persistent scheduling (SPS) configuration.

8. The method of claim 1, wherein the barring information includes a scaling factor.

9. The method of claim 8, wherein the barring information is scaled based on the scaling factor.

10. The method of claim 8, wherein the scaling factor is based on an amount of the user data.

11. The method of claim 1, wherein the wireless device is in communication with at least one of a mobile device, a network, or autonomous vehicles other than the wireless device.

12. A wireless device operating in a wireless communication system, the wireless device comprising:
    at least one transceiver;
    at least one processor; and
    at least one computer memory operably connectable to the at least one processor and storing instructions that, based on being executed by the at least one processor, perform operations comprising:
    receiving, from a network, a configuration for an uplink (UL) resource for a user data transmission in a non-connected state,
    wherein the non-connected state is a state which the wireless device enters upon receiving a connection release message from the network;
    entering the non-connected state;
    receiving, from the network, system information comprising barring information;
    based on the barring information, performing an access barring check to determine whether an access attempt to the network is allowed or barred; and
    transmitting, to the network while in the non-contacted state, user data using the UL resource based on the access attempt to the network being allowed as a result of the access barring check,
    wherein the barring information in the system information comprises a timer value for a barring timer, and
    wherein the barring timer is started based on the access attempt being barred as a result of the access barring check.

13. An apparatus operating in a wireless communication system, the apparatus comprising:
    at least one processor; and
    at least one memory coupled to the at least one processor,
    wherein the at least one processor is configured to perform operations comprising:
    receiving, from a network, a configuration for an uplink (UL) resource for a user data transmission in a non-connected state,
    wherein the non-connected state is a state which the wireless device enters upon receiving a connection release message from the network;
    entering the non-connected state;
    receiving, from the network, system information comprising barring information;
    based on the barring information, performing an access barring check to determine whether an access attempt to the network is allowed or barred; and transmitting, to the network while in the non-contacted state, user data using the UL resource based on the access attempt to the network being allowed as a result of the access barring check, wherein the barring information in the system information comprises a timer value for a barring timer, and wherein the barring timer is started based on the access attempt being barred as a result of the access barring check.

\* \* \* \* \*